United States Patent
Ozaki et al.

(10) Patent No.: US 8,320,685 B2
(45) Date of Patent: Nov. 27, 2012

(54) PICTURE PROCESSING APPARATUS AND METHOD, AND IMAGING APPARATUS

(75) Inventors: Koji Ozaki, Kanagawa (JP); Fumiaki Kato, Chiba (JP); Kenichi Sakai, Tokyo (JP)

(73) Assignee: Sony Corporation (JP)

( * ) Notice: Subject to any disclaimer, the term of this patent is extended or adjusted under 35 U.S.C. 154(b) by 1282 days.

(21) Appl. No.: 11/795,993

(22) PCT Filed: Jan. 12, 2006

(86) PCT No.: PCT/JP2006/300776
§ 371 (c)(1),
(2), (4) Date: Jul. 25, 2007

(87) PCT Pub. No.: WO2006/080240
PCT Pub. Date: Aug. 3, 2006

(65) Prior Publication Data
US 2008/0123970 A1 May 29, 2008

(30) Foreign Application Priority Data

Jan. 26, 2005 (JP) ................ P2005-017588
Aug. 10, 2005 (JP) ................ P2005-231784

(51) Int. Cl.
*G06K 9/00* (2006.01)
(52) U.S. Cl. ...................... 382/232; 382/246
(58) Field of Classification Search .............. 382/232, 382/240, 246
See application file for complete search history.

(56) References Cited

U.S. PATENT DOCUMENTS 5,602,548 A 2/1997 Chun et al.
5,949,912 A * 9/1999 Wu ........................ 382/246
6,460,061 B1 10/2002 Dick
(Continued)

FOREIGN PATENT DOCUMENTS

JM 2004-266743 A 9/2004
(Continued)

OTHER PUBLICATIONS

Bourbakis N et al: "Data-image-video encryption" IEEE Potentials, IEEE, New York, NY, US, vol. 23, No. 3, Aug. 1, 2004, pp. 28-34.

(Continued)

*Primary Examiner* — Hadi Akhavannik
(74) *Attorney, Agent, or Firm* — Lerner, David, Littenberg, Krumholz & Mentlik, LLP

(57) ABSTRACT

Data can be transferred from a picture processing section to an encoding section without necessity of using an external memory. In addition, with internal data transfer having a wider band than an external memory, data can be processed at high speed. An entire picture 41 as an original picture is divided into six blocks of (64×4) pixels each. An enlargement process is performed for each block. Data of blocks are read in the order of blocks 1, 2, 3, and so forth. A size changing section processes a first block and generates picture data of a block 42 of (128×8) pixels. From this picture data 42, macroblocks 43 of (16×8) pixels each are read and encoded. As a result, JPEG data 44 are obtained. A code rearrangement section rearranges the order of the JPEG data 46 in the unit of a block. As a result, JPEG data 48 are generated. When JPEG data 48 are decoded in this order, a decoded picture 49 whose block order matches an area 41 of the original picture is obtained.

24 Claims, 33 Drawing Sheets

U.S. PATENT DOCUMENTS

| | | | |
|---|---|---|---|
| 6,804,402 B2* | 10/2004 | Andrew | 382/240 |
| 7,171,053 B2* | 1/2007 | Van der Vleuten | 382/244 |
| 2002/0085831 A1* | 7/2002 | Mishima et al. | 386/68 |
| 2003/0063809 A1* | 4/2003 | Andrew | 382/240 |
| 2003/0179938 A1* | 9/2003 | Van der Vleuten | 382/232 |

FOREIGN PATENT DOCUMENTS

| | | |
|---|---|---|
| JP | 05-037790 A | 2/1993 |
| JP | 5-227527 | 9/1993 |
| JP | 09-083779 A | 3/1997 |
| JP | 11-298878 A | 10/1999 |
| JP | 2003-189109 A | 7/2003 |
| JP | 2003-189305 A | 7/2003 |
| JP | 2003-348355 A | 12/2003 |
| JP | 2004-336389 A | 11/2004 |
| KR | 2004-0063650 | 7/2004 |
| WO | WO-03/034709 A2 | 4/2003 |

OTHER PUBLICATIONS

Supplementary European Search Report, EP 06 70 0921, Mar. 6, 2008.

Communication from corresponding EP Application 06700921, Aug. 27, 2009.

* cited by examiner

Fig. 5
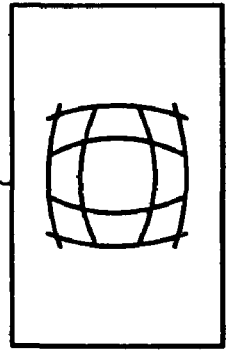
P3
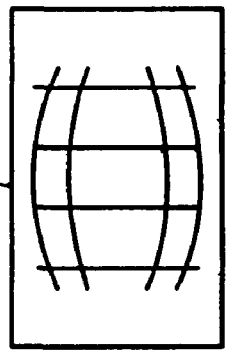
P2
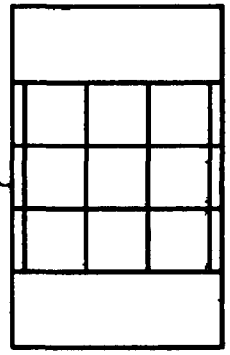
P1
ABERRATION CORRECTION

Fig. 12

| | PICTURE ACCESS AMOUNT | CODE ACCESS AMOUNT | TOTAL MEMORY ACCESS AMOUNT |
|---|---|---|---|
| METHOD SHOWN IN FIG. 2 | 6X BYTES | X / 3 BYTES | 19X / 3 BYTES |
| METHOD SHOWN IN FIG. 3 | 3.27X BYTES | X / 3 BYTES | 10.81X / 3 BYTES |
| METHOD SHOWN IN FIG. 4 | 1.27X BYTES | 3X / 3 BYTES | 6.81X / 3 BYTES |

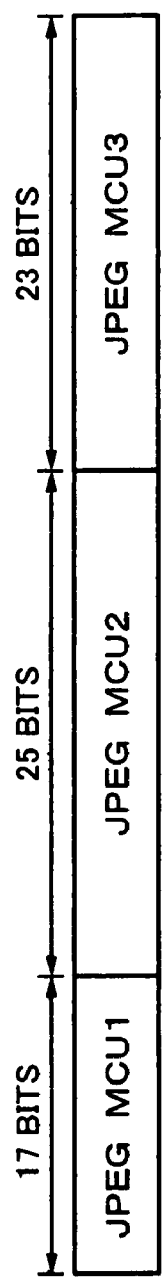
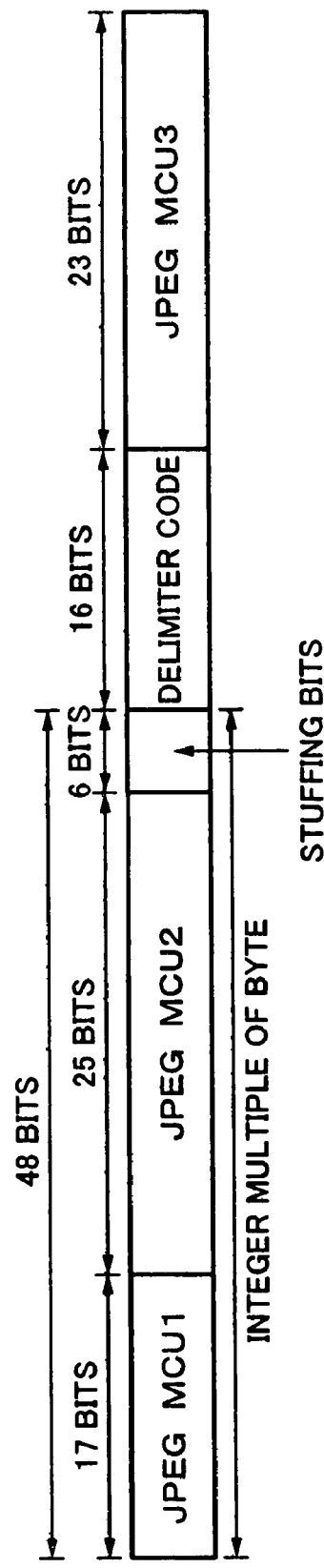
Fig. 15A
Fig. 15B

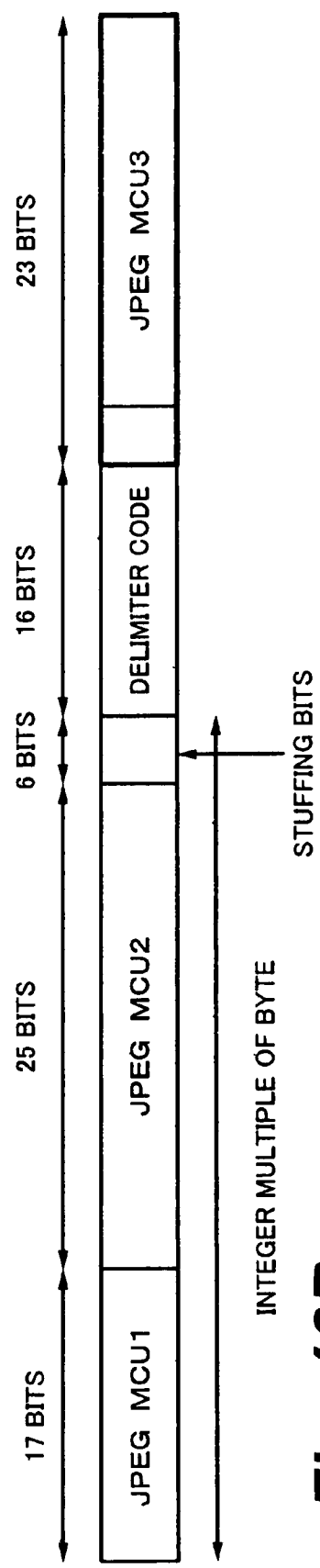
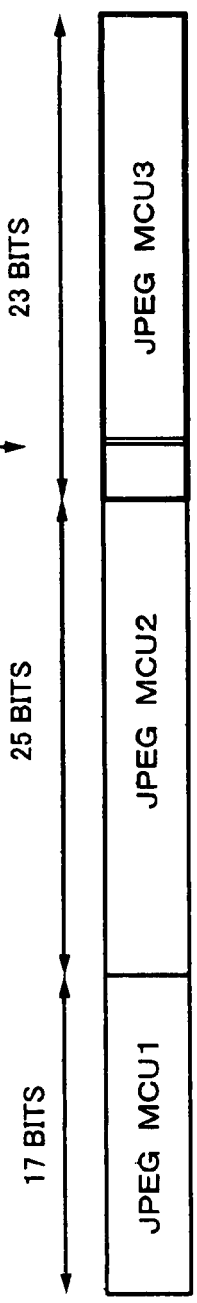
Fig. 18A
Fig. 18B

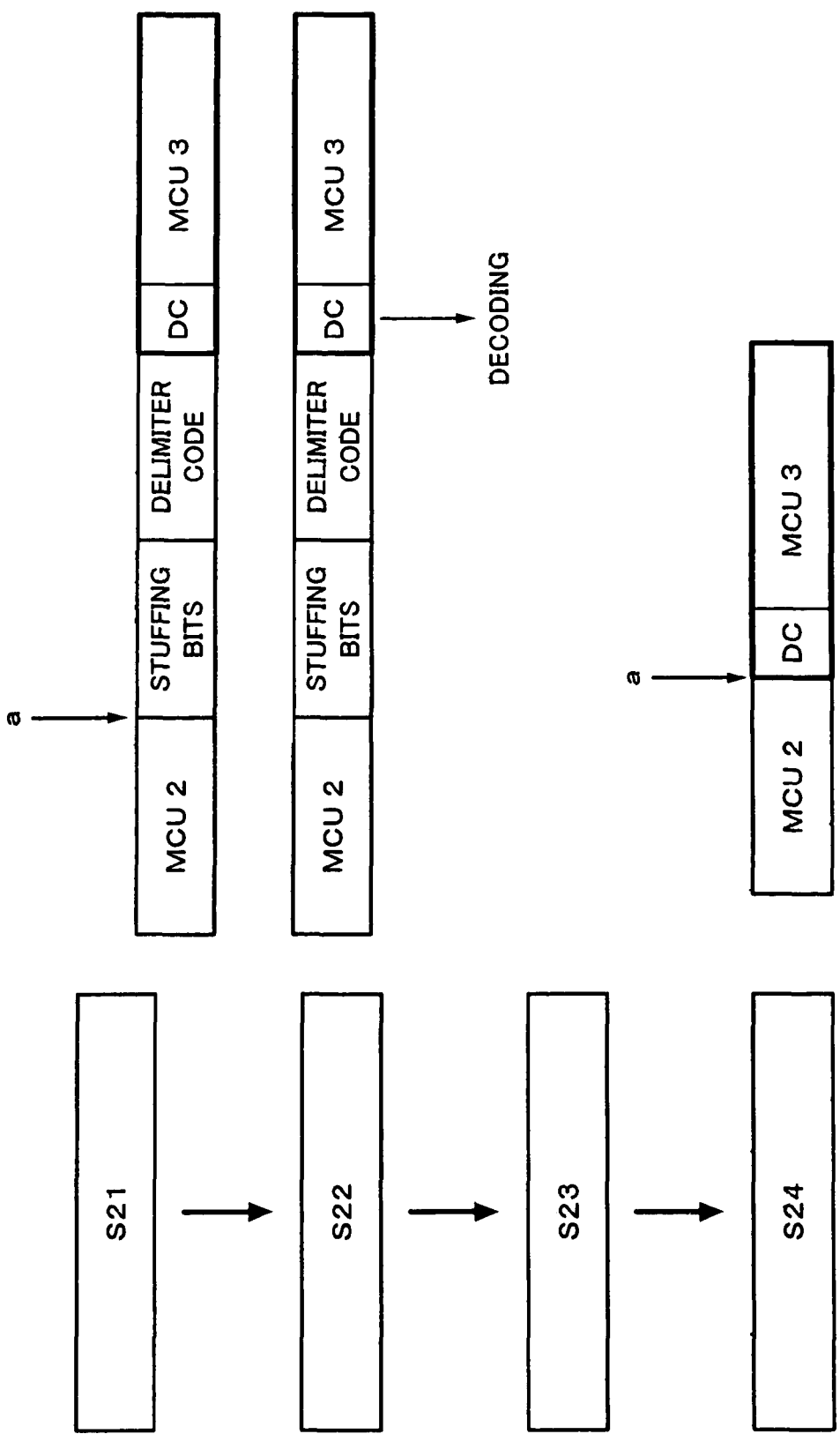

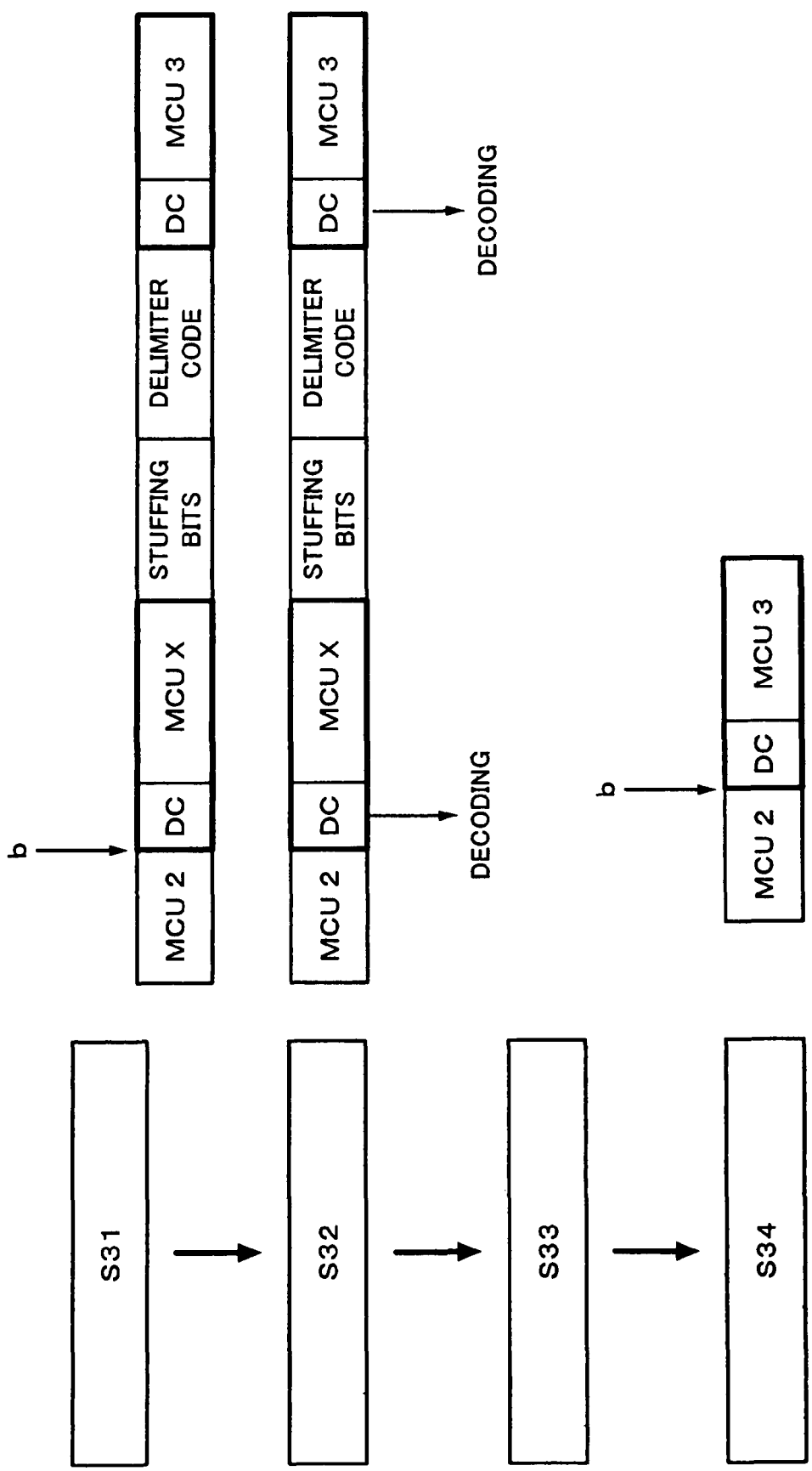

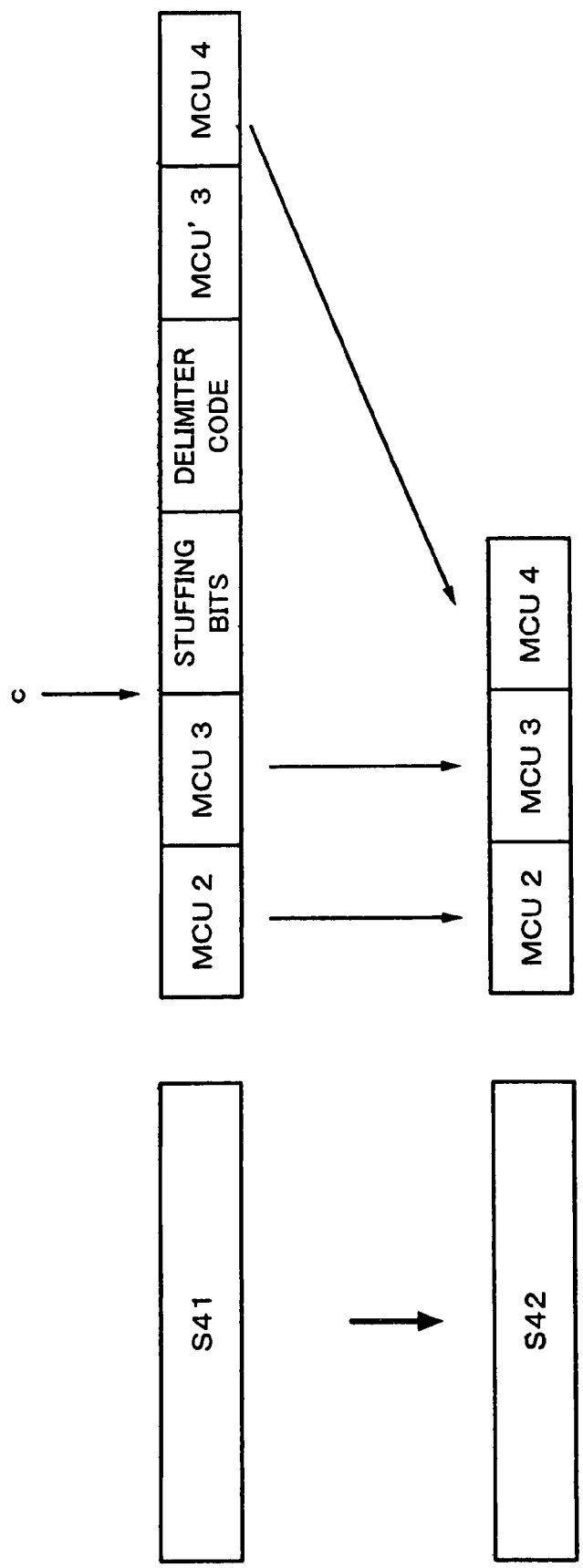

*Fig. 24A*
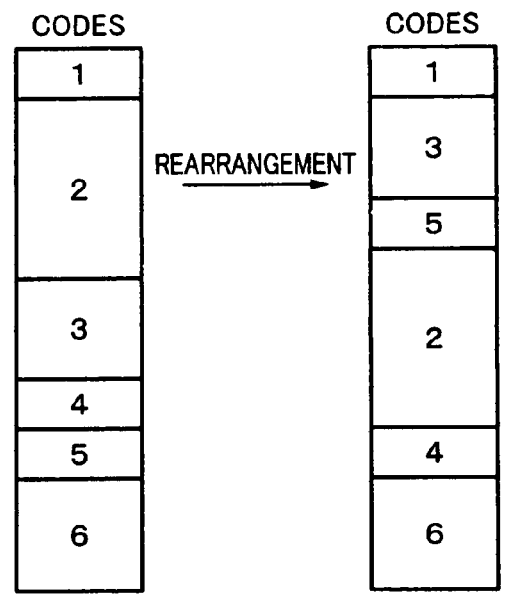
*Fig. 24B*
| 1 | 3 | 5 |
|---|---|---|
| 2 | 4 | 6 |
*Fig. 24C*
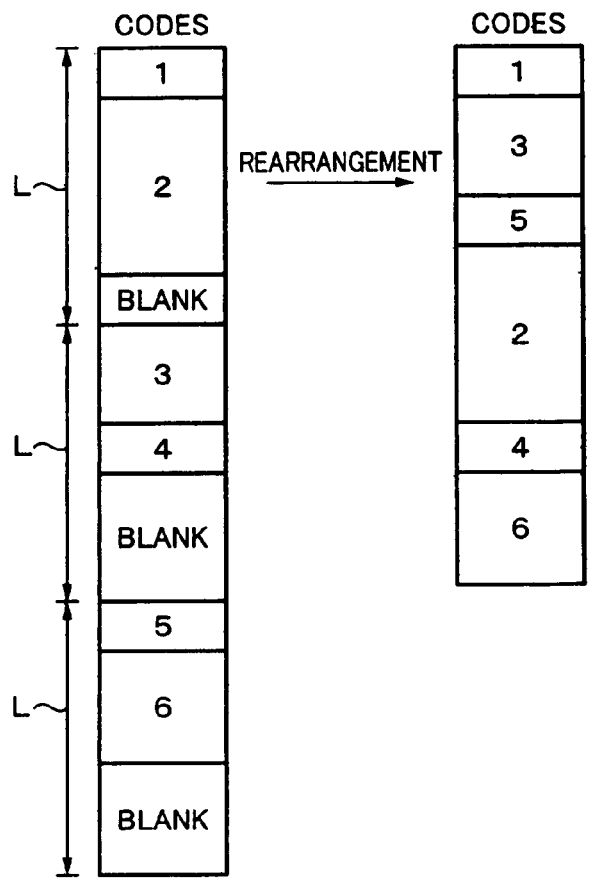

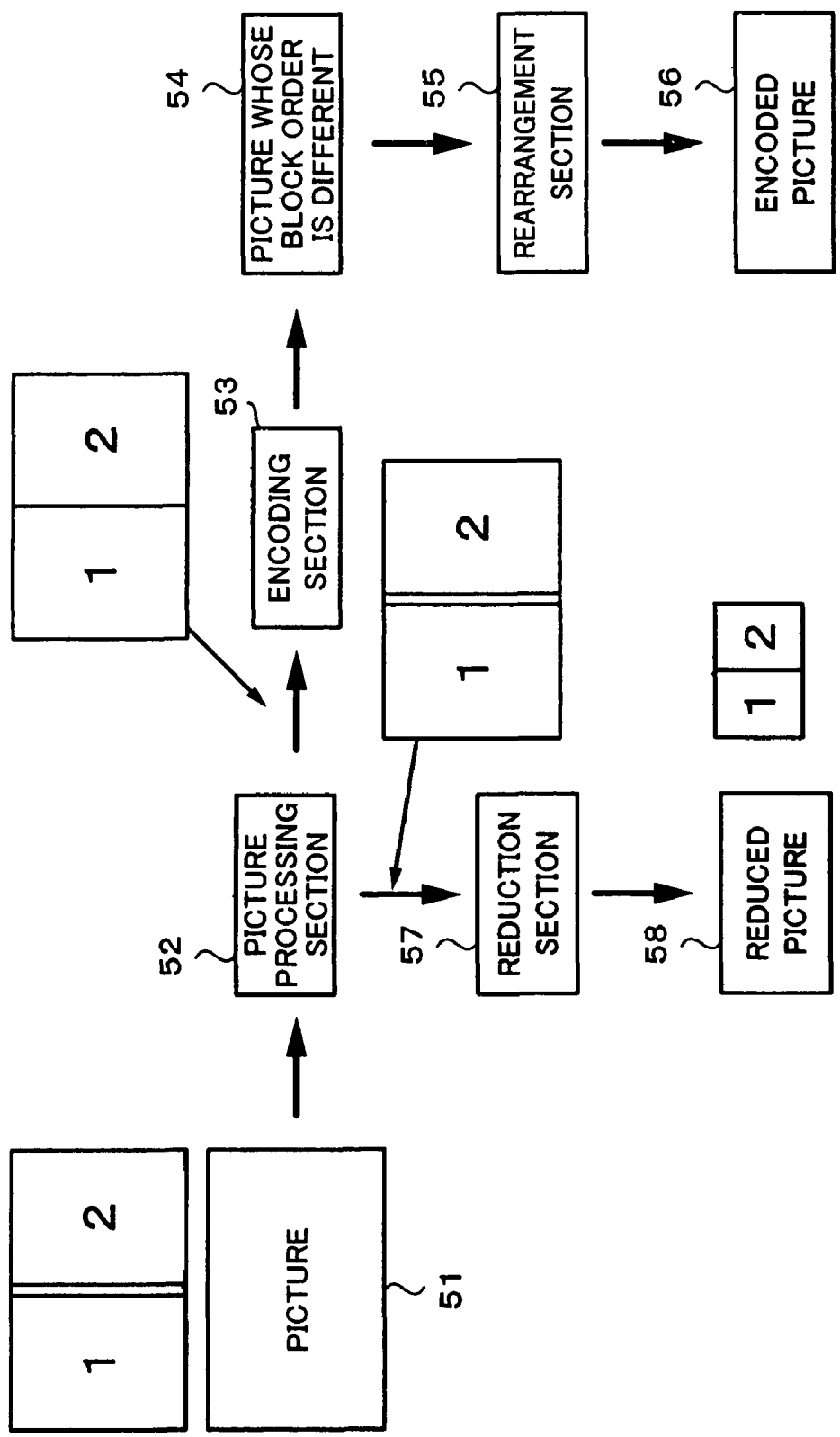

PICTURE PROCESSING APPARATUS AND METHOD, AND IMAGING APPARATUS

CROSS-REFERENCE TO RELATED APPLICATIONS

The present application is a national stage application under 35U.S.C. §371 of International Application No. PCT/JP2006/300776, filed Jan. 12, 2006, which claims priority from Japanese Application Nos. P2005-231784, filed Aug. 10, 2005, and P2005-017588, filed Jan. 26, 2005, the disclosures of which are incorporated herein by reference.

BACKGROUND OF THE INVENTION

1. Technical Field

The present invention relates to an encoding apparatus, an encoding method, an encoding program, and an imaging apparatus applied to compress for example a picture signal.

2. Background Art

An imaging apparatus such as a digital still camera often performs a picture process such as a picture distortion correction process, a chromatic aberration correction process, a picture size enlargement process or a picture size reduction process. In addition, such an apparatus often compresses picture data generated in a picture process according to a compression-encoding process such as JPEG (Joint Photographic Experts Group) or MPEG (Moving Picture Experts Group Phase). In these compression-encoding processes, picture data are encoded in the unit of a picture called a macroblock.

To perform a picture process, for example an interpolation process is performed for picture data that are read from a memory. To encode picture data, the size of an area whose picture size has been changed is set to the size of a macroblock. In such a picture size changing process, since the picture size is changed to a small size for example the size of a macroblock, it is necessary to read picture data at high speed.

Moreover, in such a picture process, not only picture data of an area to be processed, but picture data of a filtering area adjacent thereto are often used. In this case, a picture process can be more effectively performed in the unit of a larger block than in the unit of a smaller block. With reference to FIG. 1A, FIG. 1B, and FIG. 1C, this point will be described.

FIG. 1A shows an example of which a picture process is performed in the unit of (8 pixels×8 pixels) as a hatched area. Assuming that it is necessary to use an area of 2 pixels×2 pixels in the vertical and horizontal directions in the process, the number of pixels processed is 64 and the number of pixels effectively processed is (4 pixels×4 pixels=16 pixels). Thus, the efficiency (number of pixels effectively processed/number of pixels processed=25%). FIG. 1B shows the case of which the block size is (128 pixels×128 pixels=16384 pixels). In this case, the number of pixels processed is 16384 pixels, the number of pixels effectively processed is (124 pixels×124 pixels=15376 pixels), and the efficiency becomes 93%. FIG. 1C shows an example of a horizontally oblong block, for example (2048 pixels×8 pixels=16384 pixels). In this case, the number of pixels effectively processed is (2044 pixels×4 pixels=8176 pixels) and the efficiency becomes 49%. FIG. 1A, FIG. 1B, and FIG. 1C show an example of which one picture is composed of a multiple of the process unit of (3×3=9).

FIG. 2 shows an example of which data for which a picture process has been performed are encoded according to for example JPEG. In FIG. 2, one picture is composed of (4×2) macroblocks. When a picture process is performed in the unit of four macroblocks that are horizontally arranged, since their order matches the encoding direction defined in JPEG, data obtained in the picture process are successively transferred to a JPEG encoder and encoded thereby.

In FIG. 2, since the picture process unit is a horizontally oblong area, as shown in FIG. 3, it is assumed that a picture process is performed in the unit of an area composed of (2×2)=4 macroblocks 1 to 4. In this case, macroblocks 1 and 2 that have been processed are directly transferred to the encoder and encoded thereby according to JPEG. In contrast, macroblocks 3 and 4 are temporarily stored in the memory. In the next process unit (composed of macroblocks 5 to 8), macroblocks 5 and 6 that have been processed are directly transferred to the encoder and encoded thereby according to JPEG. Likewise, macroblocks 7 and 8 are temporarily stored in the memory. After macroblocks 1, 2, 5, and 6 that have been processed are encoded, macroblocks 3, 4, 7, and 8 that have been processed are read from the memory and transferred to the encoder.

When the unit of a picture process is an integer multiple of macroblocks (namely encoded blocks) and is different from the order defined in JPEG, it is necessary to store data of macroblocks to be encoded later in a memory. As a result, it is necessity to provide a temporary storage memory.

As an example of a picture process according to the present invention, there is a chromatic aberration correction process as shown in FIG. 4. A photographed picture P having a chromatic aberration is separated into a red picture Pr, a green picture Pg, and a blue picture Pb. A chromatic aberration occurs because the refractive index of a lens changes depending on the wavelength of light. Thus, since the magnitudes of primary color pictures of the same object vary, the sizes of the pictures vary. The resolutions of these primary color pictures are converted such that primary color pictures Pr', Pb', and Pg' having the same size are formed. By combining these primary color pictures, a picture P' whose chromatic aberration has been corrected is obtained. Thus, the present invention can be applied to a resolution conversion process.

FIG. 5 shows another picture process according to the present invention. In this process, a picture P1 that has a barrel-like distortion in the horizontal and vertical directions is enlarged in a first stage and thereby a picture P2 is obtained. In the first stage enlargement process, the picture P1 is enlarged in the horizontal direction. The enlargement factor is proportional to the distance from the center of the picture. The picture P2 is enlarged in a second stage and thereby a picture P3 is obtained. In the second stage enlargement process, the picture P2 is enlarged in the vertical direction. Thus, the enlargement factor is proportional to the distance from the center of the picture.

In the present invention, a rearrangement process of encoded blocks such as macroblocks is performed. A rearrangement process in the unit of a macro block is disclosed in Japanese Patent Application Laid-Open No. HEI 11-298878. In this document, after an MPEG stream is generated, it is rearranged in the unit of a macroblock such that the receiving side is prevented from watching a picture by decoding the MPEG stream.

As described above, in a picture process such as a picture size conversion process, when picture data are encoded in the encoding unit according to a compression-encoding process, it may be necessary to read picture data from a memory at high speed or use a memory having a large storage capacity. In the related art, after an MPEG stream is generated, a rearrangement process is performed therefor. In contrast, according to the present invention, a picture processing section encodes blocks in the order that is different from the regular order. Thereafter, the encoded blocks are rearranged in the regular order. This point is different from the related art.

SUMMARY OF THE INVENTION

Thus, an object of the present invention is to provide an encoding apparatus, an encoding method, an encoding program, and an imaging apparatus that are capable of solving a problem of necessity of a high speed reading process and a large capacity memory.

To solve the foregoing problem, the present invention is a picture processing apparatus having an encoding section which encodes picture data processed by a picture processing section in a predetermined encoding unit, wherein the encoding section encodes the picture data in a data output order of the picture processing section, and wherein the picture processing apparatus comprises a rearrangement section which rearranges the data from a process direction of the picture processing section to a regular process direction defined by an encoding method of the encoding section.

In addition, the present invention is a picture processing apparatus, comprising a picture processing section which performs a first stage process of rotating or inverting a picture in a picture process block composed of a plurality of encoding units and outputs data that have been processed as the first stage process; an encoding section which successively encodes the output data of the picture processing section in a predetermined encoding unit; a first rearrangement section which performs a second stage process of rearranging an output of the encoding unit from a process direction of the picture processing section to a regular process direction defined in an encoding method of the encoding section; and a second rearrangement section which performs a third stage process of rotating or inverting data which have been processed as the second stage process in a predetermined manner assuming that the picture process unit is one element.

In addition, the present invention is a picture processing apparatus, comprising a picture processing section which performs a first stage process of rotating or inverting a picture in a predetermined encoding unit and outputs data which have been processed as the first stage process; an encoding section which successively encodes the output data of the picture processing section in a predetermined encoding unit; a first rearrangement section which performs a second stage process of rearranging an output of the encoding unit from a process direction of the picture processing section to a regular process direction defined in an encoding method of the encoding section; and a second rearrangement section which performs a third stage process of rotating or inverting data which have been processed as the second stage process in a predetermined manner assuming that the encoding unit is one element.

In addition, the present invention is a picture processing method of causing an encoding section to encode picture data processed by a picture processing section in a predetermined encoding unit, comprising the steps of encoding the picture data in a data output order of the picture processing section, and rearranging the data from a process direction of the picture processing section to a regular process direction defined by the encoding section.

In addition, the present invention is a program which causes a computer to execute a picture processing method of causing an encoding section to encode picture data processed by a picture processing section in a predetermined encoding unit, the picture processing method comprising the steps of encoding the picture data in a data output order of the picture processing section, and rearranging the data from a process direction of the picture processing section to a regular process direction defined by the encoding section.

In addition, the present invention is an imaging apparatus having a picture processing section which performs a picture process for picture data captured by an image sensor and an encoding section which encodes the picture data processed by the picture processing section in a predetermined encoding unit, wherein the encoding section encodes the picture data in a data output order of the picture processing section, and wherein the imaging apparatus comprises a rearrangement section which rearranges the data from a process direction of the picture processing section to a regular process direction defined by an encoding method of the encoding section.

According to the present invention, the picture processing section for example that converts the picture size transfers picture data to the compression-encoding section in the unit of data that the picture processing section processes, namely in the unit of a small amount of data. Thus, the picture data can be transferred without necessity of using an external memory. In addition, since picture data can be transferred without necessity of using the external memory, they can be internally transferred with a band wider than that of the external memory. As a result, the process can be performed at high speed.

BRIEF DESCRIPTION OF THE DRAWINGS

FIG. 5 is a schematic diagram describing another example of a picture process according to the present invention;

FIG. 12 is a schematic diagram showing comparison of memory access amounts of the picture processing apparatus of the present invention and another structural example;

FIG. 15A and FIG. 15B are schematic diagrams describing a delimiter code insertion process according to an embodiment of the present invention;

FIG. 18A and FIG. 18B are schematic diagrams describing a delimiter code deletion process according to an embodiment of the present invention;

FIG. 19 is a schematic diagram describing a first method of the delimiter code deletion process according to an embodiment of the present invention;

FIG. 21 is a schematic diagram describing a second method of the delimiter code deletion process according to an embodiment of the present invention;

FIG. 22 is a schematic diagram describing a third method of the delimiter code deletion process according to an embodiment of the present invention;

FIG. 24A, FIG. 24B, and FIG. 24C are schematic diagrams describing efficiency of a rearrangement process according to an embodiment of the present invention;

FIG. 25 is a block diagram showing another structure of the picture processing apparatus according to the present invention;

DETAILED DESCRIPTION

Best Modes for Carrying Out the Invention

Figure 1A:
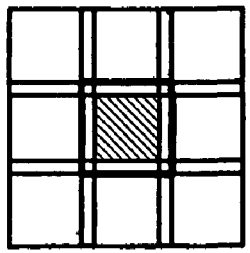
FIG. 1A, FIG. 1B, and FIG. 1C are schematic diagrams describing the relationship of sizes and process efficiencies of picture process blocks.
Figure 1B:
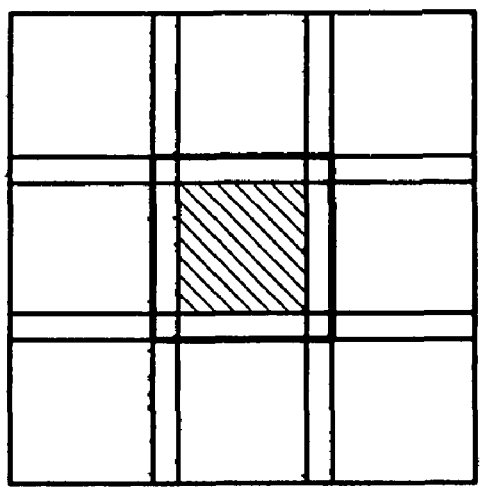
Figure 1C:
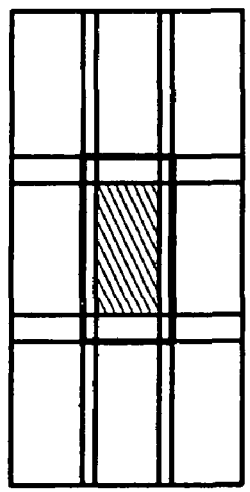
Figure 2:
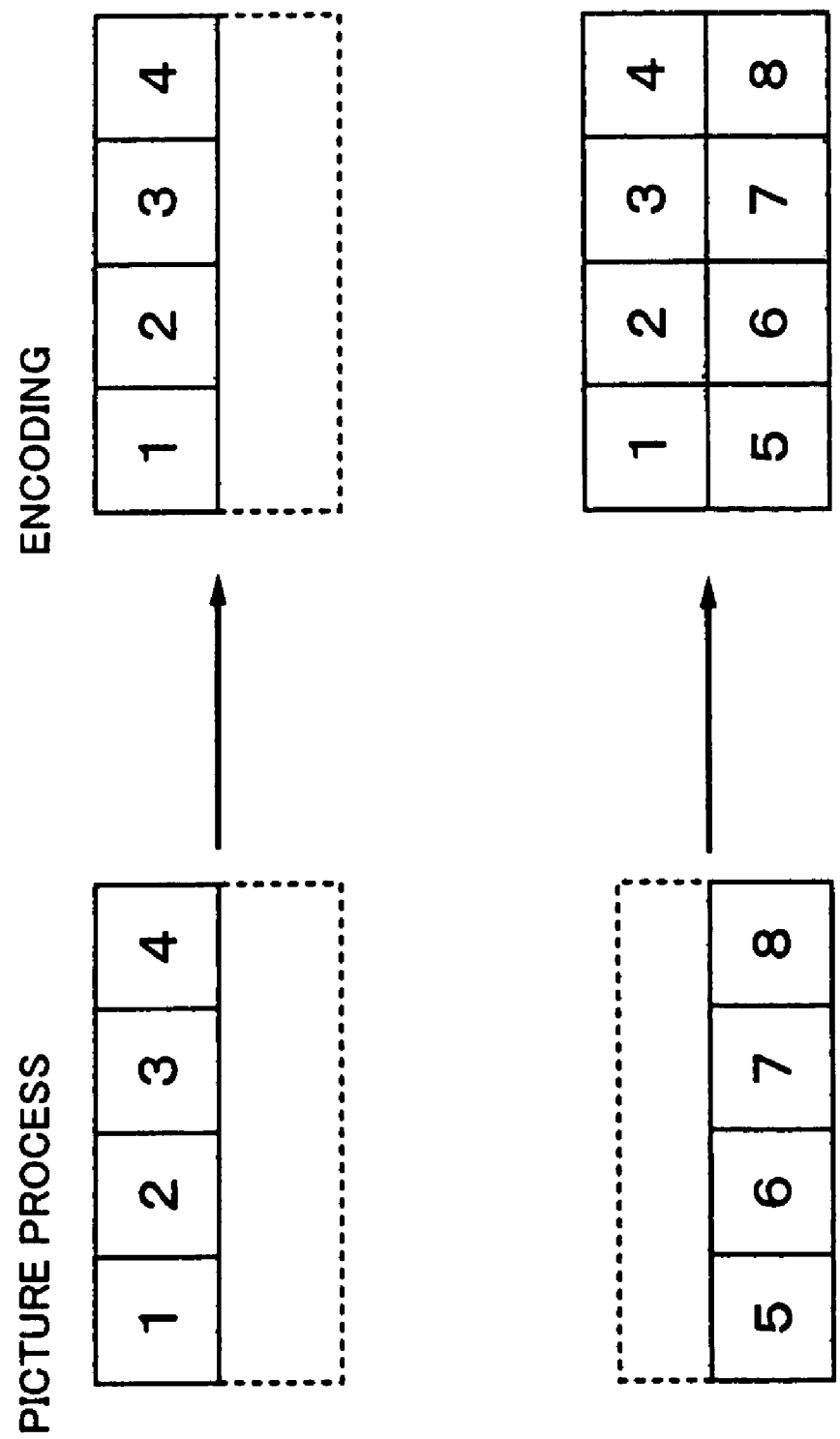
FIG. 2 is a schematic diagram describing a process in the case that the direction of the picture process matches the encoding direction.
Figure 3:
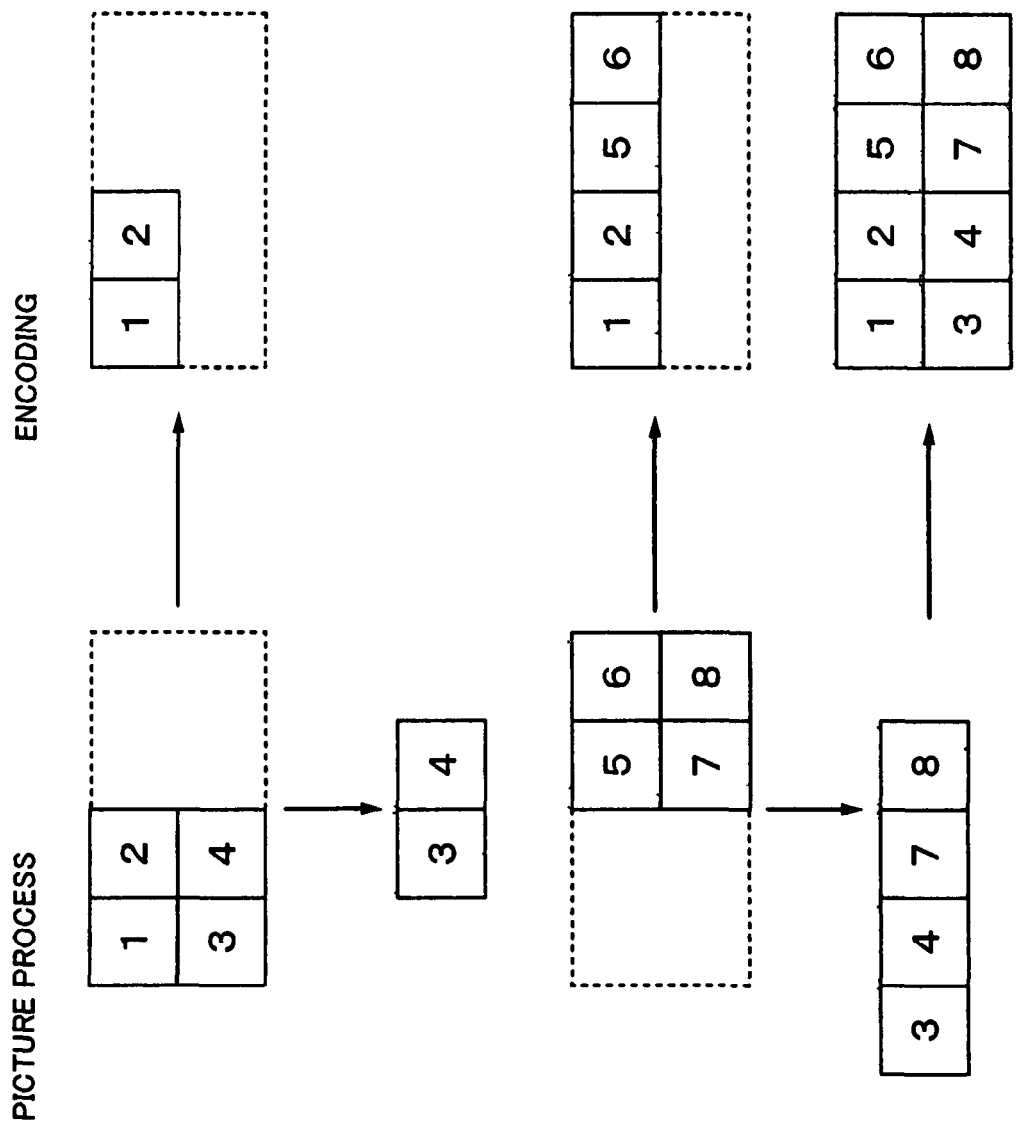
FIG. 3 is a schematic diagram describing a process of related art in the case that the direction of the picture process does not match the encoding direction.
Figure 4:
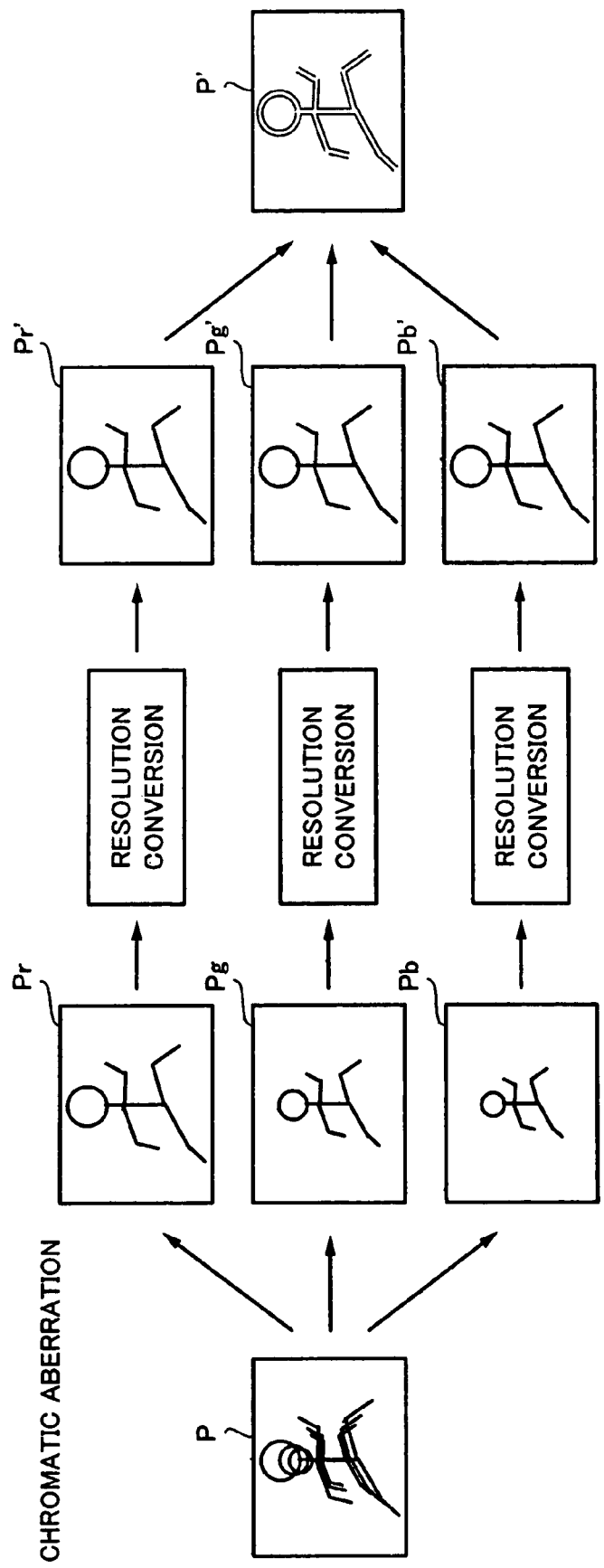
FIG. 4 is a schematic diagram describing an example of a picture process according to the present invention.
Figure 6:
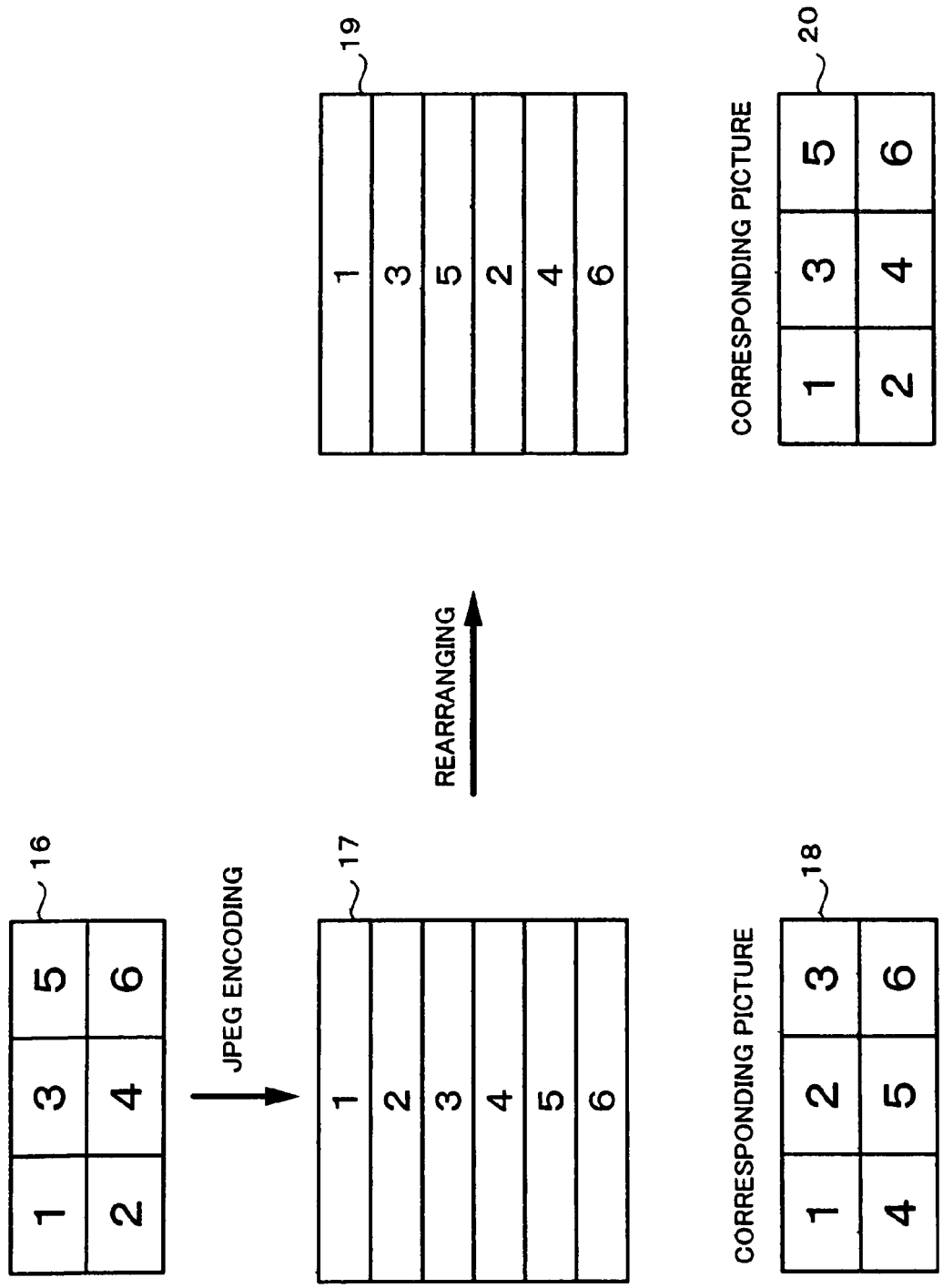
FIG. 6 is a schematic diagram describing an example of a process according to the present invention.

First of all, with reference to FIG. 6, processes of the present invention will be described in brief. In FIG. 6, reference numeral 16 represents an original picture to be processed. The picture 16 is composed of six encoding units (when the picture 16 is encoded according to JPEG, the picture 16 is composed of six macroblocks). The six macroblocks are represented by macroblocks 1 to 6. A picture process is performed in the unit of two macroblocks, for example macroblocks 1 and 2. After the picture process has been performed for data, they are encoded by a JPEG encoder. As a result, encoded data 17 are obtained. As described above, picture processes include an enlargement process, a reduction process, a chromatic aberration correction process, a picture distortion correction process, a camera signal process, a white/black inversion process, a color space conversion process, and a filtering process.

If the JPEG data 17 are decoded in these order, a corresponding picture 18 is obtained. However, since the order of blocks of the decoded picture 18 is different from that of the original picture 16, the decoded picture 18 is different from the original picture. To solve this problem, the blocks of the JPEG data 17 are rearranged.

A code rearrangement section rearranges the blocks of the JPEG data 17 and generates JPEG data 19. When the JPEG data 19 are decoded, a corresponding picture 20 whose block order matches that of the original picture 16 is obtained.

Figure 7:
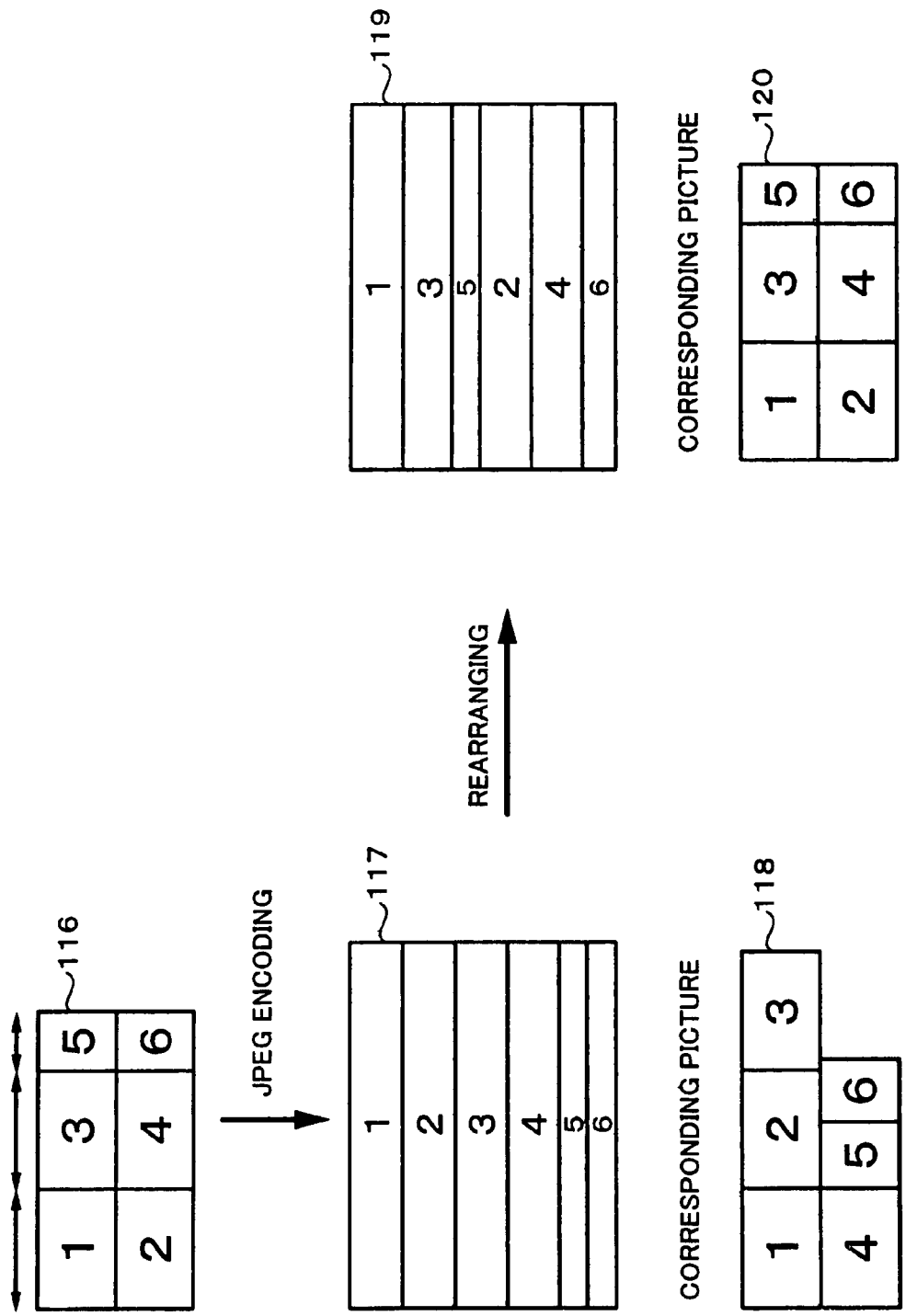
FIG. 7 is a schematic diagram describing another example of a process according to the present invention.

In the example shown in FIG. 6, the width of the original picture is equal to that of a total of three macroblocks. However, in an example of which the width of a picture process unit is equal to that of a plurality of macroblocks, as shown in FIG. 7, there may be a plurality of widths of picture process units. For example, when the width of a picture is not an integer multiple of a picture process unit, the size of the last macroblocks may be different from that of the other macroblocks. The width of a total of picture process units having different sizes is equal to that of the picture. In this case, when data are encoded, if delimitation intervals of macroblocks are changed, they can be rearranged as with the example shown in FIG. 6. In other words, when a picture 116 is encoded according to JPEG, JPEG data 117 are obtained. Since a picture 118 corresponding to the JPEG data 117 is different from the original picture, the JPEG picture 117 is rearranged and thereby a JPEG picture 119 is generated. A picture 120 corresponding to the JPEG 119 matches the original picture.

Figure 8:
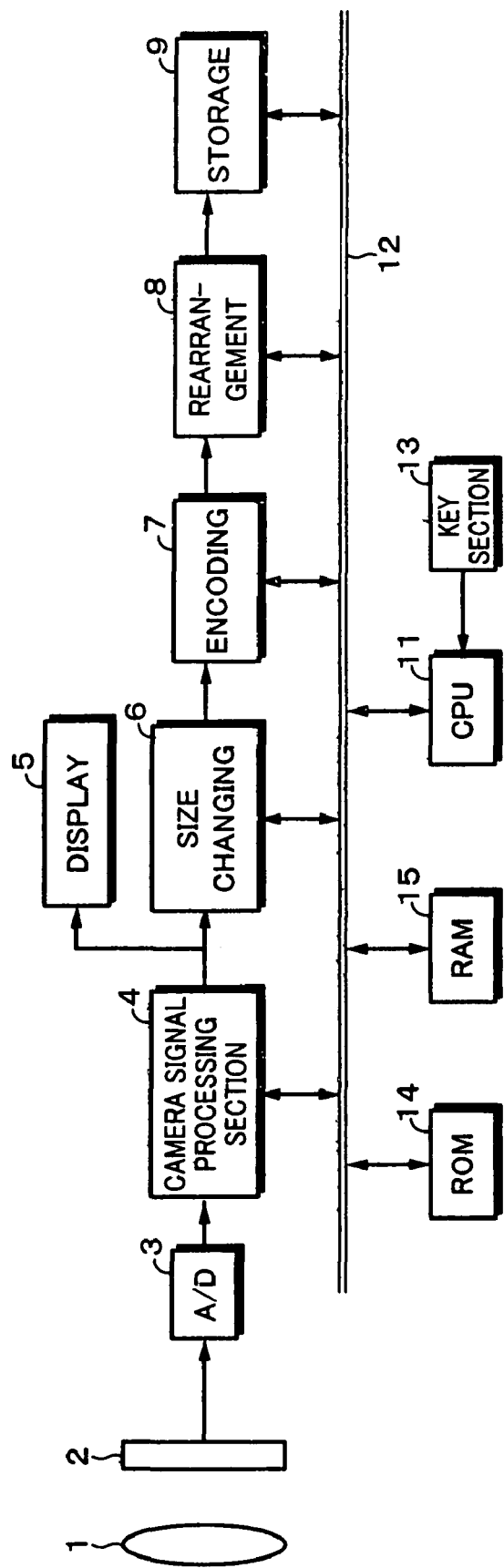
FIG. 8 is a block-diagram showing an imaging apparatus according to an embodiment of the present invention.

Next, an embodiment of the present invention will be described. FIG. 8 shows a structure of an imaging apparatus, for example, a digital still camera, according to an embodiment of the present invention. In FIG. 8, reference numeral 1 represents a lens device. Reference numeral 2 represents an image sensor such as a CCD (Charge Coupled Device) or a CMOS (Complementary Metal Oxide Semiconductor). The image sensor 2 is provided with, for example, a Bayer arrayed primary color filter. As an outputs of the image sensor 2, a primary color signal is obtained. The primary color signal is converted into a digital signal by an A/D converter 3.

A digitally captured signal supplied from the A/D converter 3 is input to a camera signal processing section 4 composed of an LSI (Large Scale Integrated Circuit). The camera signal processing section 4 performs a white balance correction process, an interpolation process, a filtering process, a matrix calculation process, a gamma correction process, a luminance signal (Y) generation process, a color difference signal (Cr, Cb) generation process, and so forth. A picture signal generated by the camera signal processing section 4 is supplied to a display 5. The display 5 displays a captured picture. A size conversion process, a compression process, and so forth are performed for picture data supplied from the camera signal processing section 4. The processed data are stored in an internal or external storage medium 9.

The white balance correction process corrects unbalance of color spaces due to difference of color temperature environments of an object or difference of sensitivities of color filters. The interpolation process interpolates a non-existent color signal. The filtering process is a high frequency correction process that enhances an edge. The matrix calculation process is a process that converts a captured signal into sRGB. The gamma correction process reversely corrects non-linear characteristics of the display device, resulting in accomplishing linear characteristics.

The luminance signal generation process combines RGB signals that have been gamma-corrected at predetermined combining ratios, resulting in generating a luminance signal. The color difference signal generation process block combines the RGB signals that have been gamma-corrected at predetermined combining ratios, resulting in generating color difference signals. The generated color difference signals are band-restricted, resulting in generating color difference signals Cb and Cr.

Outputs (Y, Cr, Cb) of the camera signal processing section 4 are input to a size changing section 6. The size changing section 6 keeps, enlarges, or reduces the picture size. Output data of the size changing section 6 are input to for example a JPEG encoding section 7. The encoding section 7 is composed of a DCT (Discrete Cosine Transform) quantizing device and a variable length code encoding device.

The DCT quantizing device performs a DCT calculation in the unit of a block of (8×8) pixels and thereby obtains DCT coefficients composed of a DC (Direct Current) coefficient and AC (Alternate Current) coefficients. The DCT quantizing device separately quantizes the DC coefficient and AC coefficients. The variable length code encoding device encodes the difference between the quantized DC coefficient of the current block and the DC coefficient of the preceding block. However, after a delimiter code that is a predetermined value code that represents delimitation, the variable length code encoding device encodes a DC coefficient itself. The variable length code encoding device zigzag-scans quantized AC coefficients and encodes the rearranged AC coefficients with variable length codes. Resultant picture data compressed by the encoding section 7 are supplied to a rearrangement section 8. The rearrangement section 8 rearranges the compressed picture data in the regular process direction defined in JPEG. In other words, the regular process direction means the encoding order of which the original picture is obtained when an encoded picture is decoded according to JPEG. The encoded picture data are stored in a storage 9.

To control the forgoing signal process and so forth of the digital still camera, a CPU (Central Processing Unit) 11 is disposed. The camera signal processing section 4, the size changing section 6, the encoding section 7, the rearrangement section 8, and the storage 9 are connected to the CPU 11 through a CPU bus 12 such that the CPU 11 can control them. An output of a key section 13 such as switches and a GUI (Graphical User Interface) that the user operates is input to the CPU 11. In addition, a ROM 14, which stores a program and so forth, and a RAM 15, which is a working memory for the CPU 11, are connected to the CPU bus 12. Picture data can be stored in the RAM 15 under the control of the CPU 11. In the structure shown in FIG. 8, for simplicity, a structure that decodes compressed picture data read from the storage 9 and displays the decoded data on the display 5 is omitted.

According to the present invention, in the structure of the digital still camera, the size changing section 6, the encoding section 7, and the rearrangement section 8 do not use a high speed process and a large capacity memory. In this embodiment according to JPEG, the size of a macroblock, which is an encoding unit, is (16×8) pixels and a macroblock is composed of two luminance (Y) blocks of (8×8) pixels each and two color difference (Cr, Cb) blocks of (8×8) pixels each. The width of a pixel of color difference data is twice that of luminance data. Thus, the number of bits per pixel is 16 bits (Y=8 bits, Cr=4 bits, Cb=4 bits). The luminance data and two types of color difference data are separately processed. Since the process for the color difference data is the same as that for the luminance data, only the process for the luminance data will be described.

Figure 9:
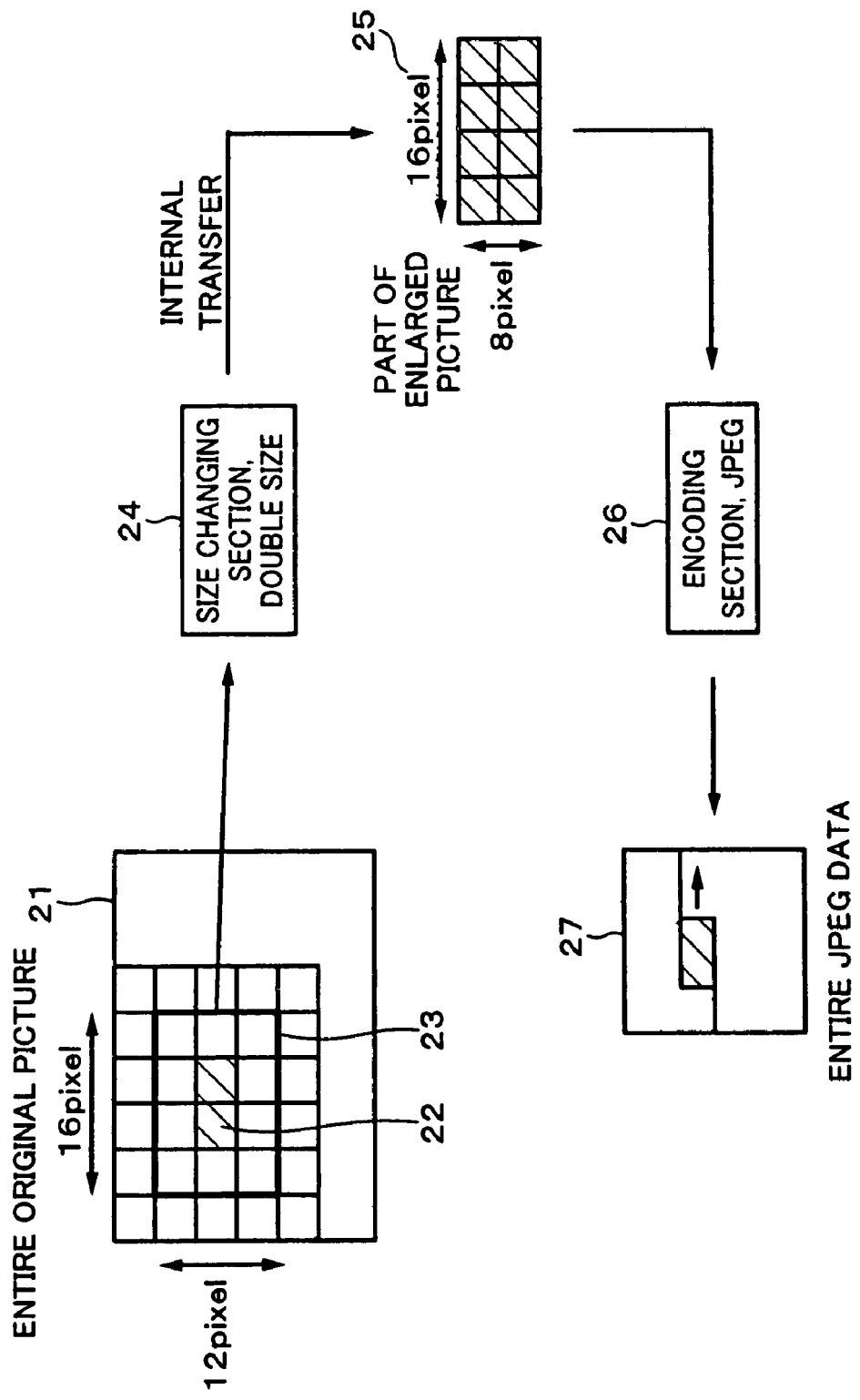
FIG. 9 is a schematic diagram describing a picture process of related art.

For easy understanding of the present invention, first of all, with reference to FIG. 9, the structure of the related art will be described. As an example of a picture process, a picture enlargement process will be described. In FIG. 9, reference numeral 21 represents an external memory. Reference numeral 24 represents a size changing section. The size changing section 24 has an interpolation digital filter that for example doubles the size of a picture. In the structure of the related art, picture data are read from the external memory 21 such that the size of the picture that is doubled becomes the size of a macroblock, which is the encoding unit.

To cause the double-size picture to be equal to the size of a macroblock, the size changing section 24 enlarges a (4×8) pixel area 22, which is a shaded area, in the external memory 21. Since the size changing section 24 uses an interpolation filter such as an FIR filter, the size changing section 24 reads a (16×12) pixel area 23, including for example the area 22, from the external memory 21. In other words, since the interpolation filter uses more (4+4) pixels both in the horizontal direction and vertical direction against the original area, the number of pixels that are read increases. This invention can be applied to the reduction process as well as the enlargement process.

Data 25 of a macroblock of (8×16) pixels enlarged by the size changing section 24 are directly transferred to an encoding section 26 not through the memory. The encoding section 26 encodes the data 25 according to JPEG. The JPEG encoded data are written to an external memory 27. The JPEG standard defines that the direction from the left end to the right end of a picture is a regular process direction. The order of which the area 22 is read is the same as the regular process direction. The external memory 27 and the external memory 21 can be structured as different memory areas of the same RAM.

In the structure of the related art shown in FIG. 9, when JPEG data are successively decoded in the unit of a macroblock, an enlarged picture can be restored. However, since a block to be processed is so small that after it is enlarged, the enlarged block becomes a macroblock, it is necessary to read pixels six times as many as pixels (two times as many as pixels in the horizontal direction and three times as many as pixels in the vertical direction) of the area 22 to be enlarged. Thus, it is necessary to read pixels at high speed and to use a wide memory area. In addition, as will be described later, the access amount to the memory adversely increases.

Figure 10:
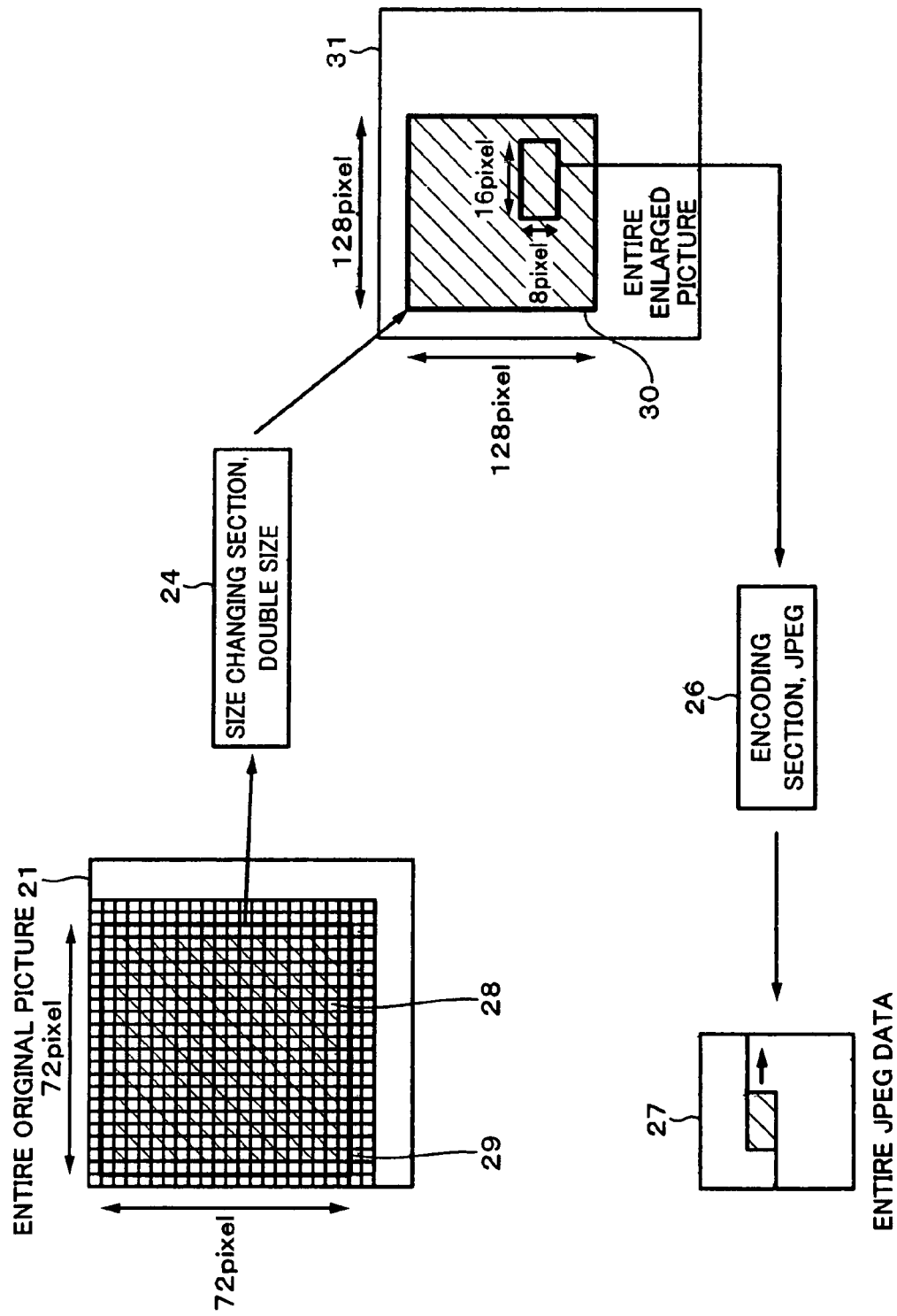
FIG. 10 is a schematic diagram describing an example of a reference of a picture process.

In the structure of the related art shown in FIG. 9, the size changing section 24 performs the enlargement process in an encoding unit of (16×8) pixels. In contrast, FIG. 10 shows an example of a structure of which the unit of the enlargement process is increased, resulting in solving the problems of the large memory area and large access amount.

A shaded area 28 of (64×64) pixels is an area to be enlarged. The size changing section 24 reads an area 29 of (72×72) pixels from the external memory 21. The size changing section 24 generates picture data of an area 30 of (128× 128) pixels, which doubles the area 28. Since the picture data of the area 30 is different from the size of a macroblock according to JPEG, the picture data of the area 30 are not able to be directly transferred to the encoding section 26. In other words, data of an enlarged picture are written to an external memory 31 that has a capacity of one picture, for example, one frame. Picture data are read from the external memory 31 in the unit of a macroblock. Thus, to process the area 28 of (64×64) pixels, it becomes necessary to use the area 29 of (72×72) pixels. As a result, the amount of data to be transferred is increased by around 1.27 times. This ratio does not necessitate a high transfer rate. However, as will be described later, the access amount to the memory is larger than that of the process according to the present invention.

An area of a macroblock of (16×8) pixels according to JPEG is read from the external memory 31 in the regular process direction defined in JPEG. The encoding section 26 encodes data of the macroblock, which has been read, according to JPEG. The encoding section 26 writes JPEG data as the encoded data to the external memory 27 in the unit of a macroblock.

In the structure shown in FIG. 9, since the size of a picture is changed in the unit of a macroblock, an internal memory 25 that has a relatively smaller capacity and that can be provided in the size changing section 24 can be used. However, in the structure shown in FIG. 10, it is necessary to supply picture data that are cut in the unit of a macroblock to the encoding section 26. Thus, it is necessary to use the external memory 31 that has a large capacity and that can store the entire enlarged picture.

Figure 11:
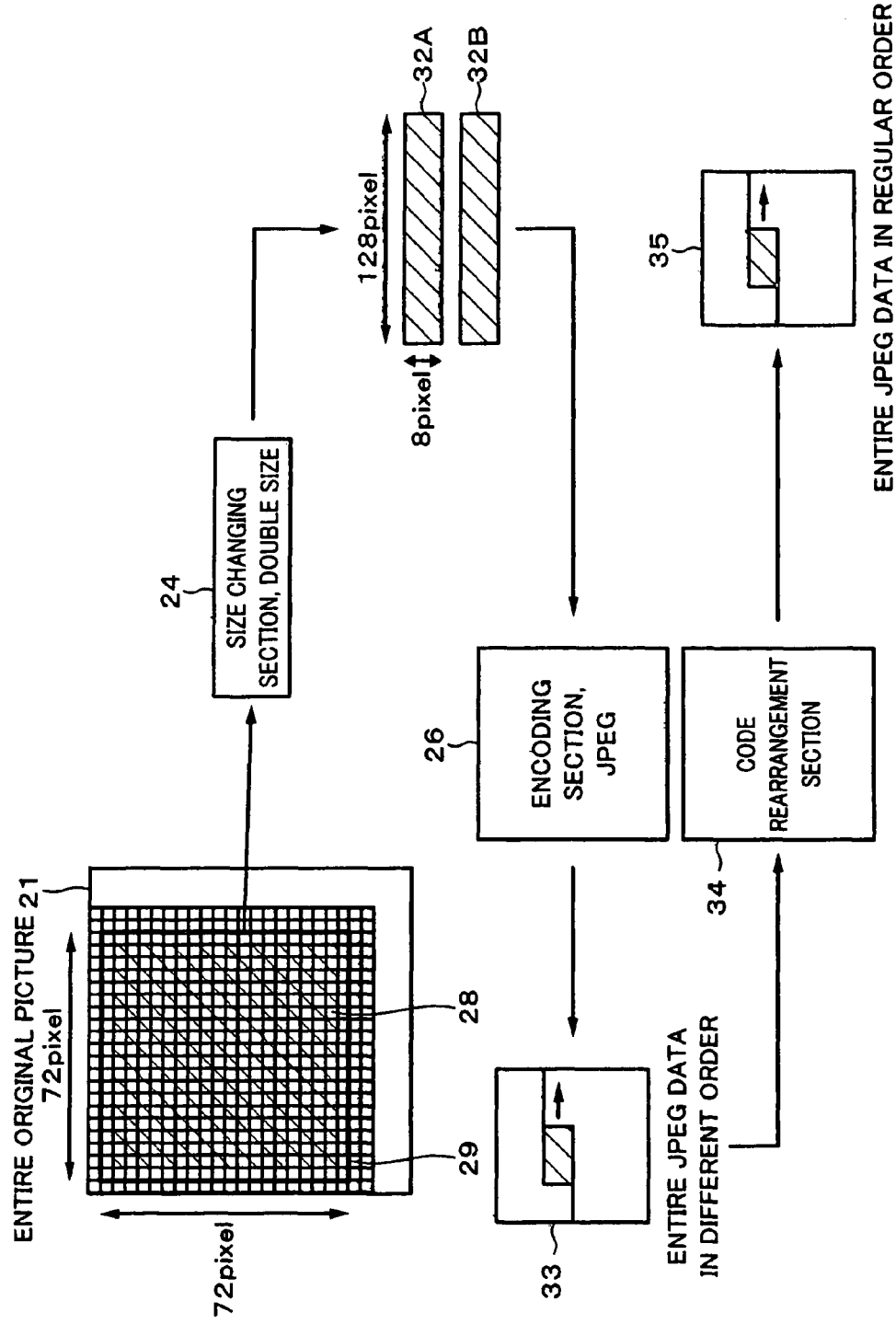
FIG. 11 is a schematic diagram describing a picture processing apparatus according to an embodiment of the present invention.

FIG. 11 shows a structure of an embodiment of the present invention. Like the example of the structure shown in FIG. 10, since a shaded area 28 of (64×64) pixels is enlarged, the size changing section 24 performs the enlargement process with an area 29 of (72×72) pixels of which periphery pixels are added to a block supplied from the external memory 21. In this case, the area 28 is divided into areas of (64×4) pixels (sometimes referred to as blocks). The reading process and the enlargement process are performed in the unit of a block. Thus, the size changing section 24 outputs data of (128×8) pixels, which are twice as large as one block. The output order of the size changing section 24 is different from the regular process direction defined in JPEG.

In this embodiment, since picture data are encoded according to JPEG without changing the order of the size changing process, the picture data can be directly transferred. In addition, a small capacity memory divides a block into a plurality of macro blocks. In this embodiment, output data of the size changing section 24 are transferred to relatively small capacity internal memories 32A and 32B and alternately written thereto. When the size of a macro block, which is an encoding unit, is (16×8) pixels, enlarged data are processed in the unit of a block whose width becomes an integer multiple of 8 pixels and whose height becomes an integer multiple of 16 pixels after the 2× enlargement process. The block has a size of (64×4) pixels. An area having a size of (128×8) pixels after the enlargement process is also referred to as a block.

The memories 32A and 32B are structured as two banks. While picture data of a block of (128×8) pixels are being written to one memory, picture data are read from the other memory in the unit of a macroblock according to JPEG. A block of (128×8) pixels corresponds to a block of (64×4) pixels of the original picture 28. Like the example of the structure shown in FIG. 9, to process the area 28 of (64×64) pixels, it is necessary to use the area 29 of (72×72) pixels. Thus, the amount of data to be transferred increases by around 1.27 times. This ratio does not necessitate a much higher transfer rate.

Data are successively read from the memories 32A and 32B in the unit of a macroblock of (16×8) pixels according to JPEG. The memories 32A and 32B each store picture data of eight macroblocks of (128×8) pixels each. Data of a macroblock that is read are encoded according to JPEG by the encoding section 26. The encoding section 26 writes JPEG data to an external memory 33 in the unit of a macroblock.

Even if JPEG data stored in the external memory 33 are decoded by the JPEG decoder, the JPEG data are not able to be correctly restored because the encoding order of the JPEG data does not match the order defined in JPEG. The encoding order defined in JPEG is from the left end to the right end of a picture.

Thus, a code rearrangement section 34 rearranges JPEG data stored in the external memory 33. The code rearrangement section 34 rearranges JPEG data for example by controlling read addresses of the external memory 33. The external memory 33 necessitates to have a capacity of an enlarged picture for rearrangement. However, since the data amount is compressed into its fragment according to JPEG, the data amount for JPEG data stored in the external memory 33 is able to be smaller than that for original picture data.

The code rearrangement section 34 outputs JPEG data to an external memory 35 in the regular process order defined in JPEG. Thus, the external memory 35 stores JPEG data in the regular process order. As a result, when the decoder structured according to JPEG decodes the JPEG data, it can correctly restore the picture.

FIG. 12 is a table comparing memory access amounts (write access amounts or read access amounts) of the structures shown in FIG. 8, FIG. 9, and FIG. 10. It is assumed that data of x bytes of an original picture have been compression-encoded such that the data amount is decreased by ⅓. In the structure shown in FIG. 9, to enlarge the area 22 of (4×8) pixels, the area 23 of (16×12), which is six times as large as the area 22, is read from the external memory 21 and then transferred to the encoding section 26. Thus, the picture access amount becomes 6× bytes. Since JPEG data are written to the external memory 27 one time, the memory access amount becomes x/3 bytes. As a result, the total memory access amount (=picture access amount+code access amount) becomes 19x/3 bytes.

In the structure shown in FIG. 10, since the 1.27× pixel area is read from the external memory 21, the 2× area 30 is written to the external memory 31, and picture data of a macroblock are written to the external memory 31, the picture access amount to the external memory 21 becomes (1.27+2=3.27)× bytes. Thus, the picture access amount becomes (1.27+2=3.27)× bytes. Since JPEG data are written to the external memory 27 one time, the memory access amount becomes x/3 bytes. Thus, the total memory access amount (=picture access amount+code access amount) becomes 10.81x/3 bytes.

In the structure of the embodiment (FIG. 11) of the present invention, since the 1.27× pixel area is read from the external memory 21 and the picture data are directly transferred to the encoding section 26, the picture access amount to the external memory 21 becomes 1.27× bytes.

To rearrange encoded data, it is necessary to write and read them to and from the external memory 33 and to write them to the external memory 35. Thus, three accesses are necessary. Since data that are written or read are JPEG data, the code access amount becomes (3x/3 bytes). Thus, the total memory access amount (=picture access amount+code access amount) becomes 6.81x/3 bytes, which is the smallest in these structures. In this embodiment, since the memories 32A and 32B are accessed, the picture access amount increases. However, the output of the size changing section 24 may be directly transferred to the encoding section 26 without providing the memories 32A and 32B. Instead, since an internal memory can be used as the memories 32A and 32B, the data transfer rate can be increased. Thus, the influence of the increase of the access amount can be reduced.

Figure 13:
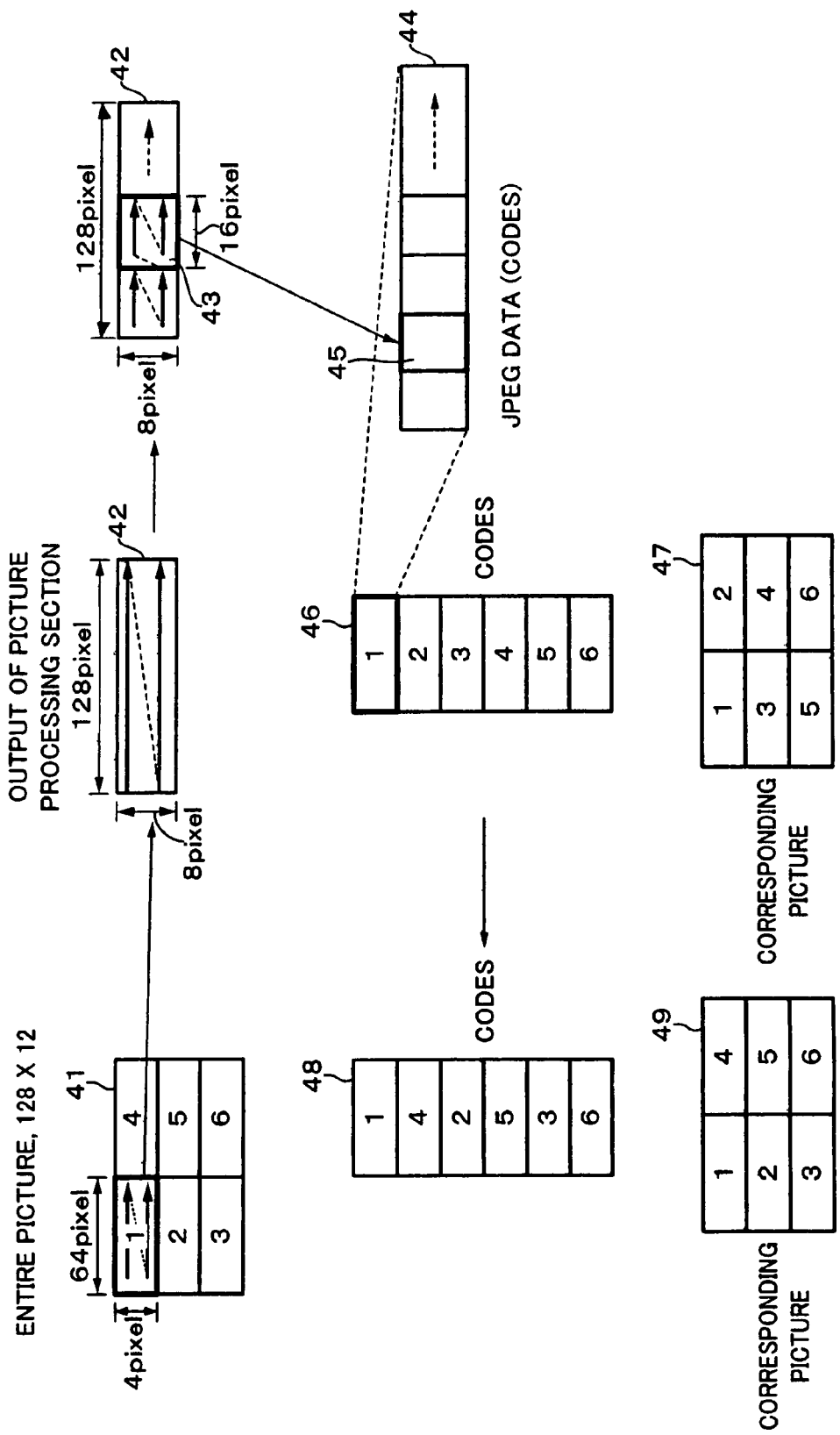
FIG. 13 is a schematic diagram describing a picture process of the picture processing apparatus according to an embodiment of the present invention.

Next, with reference to FIG. 13, an embodiment of the present invention will be described. In FIG. 13, reference numeral 41 represents an entire original picture to be enlarged, for example, an area of (128×12) pixels. The area 41 is divided into six blocks of (64×4) pixels each. The six blocks are represented by blocks 1 to 6. An enlargement process is performed for each block. In FIG. 13, an arrow in each block represents the process order. The process starts from the upper left corner of each area and ends with the lower right corner of each block of the drawing. The encoding order in each block matches the regular process direction defined in JPEG. However, the process direction of each block is different from the regular process direction defined in JPEG. Thus, it is necessary to rearrange the blocks. In other words, when pixels are read in the order of a block, data of blocks are read in the order of blocks 1, 2, 3, and so forth.

The size changing section 24 processes a first block of (64×4) pixels and generates picture data of a block 42 of (128×8) pixels, whose width and height are two times as large as the height and width of the first block. The picture data 42 are written to one of the internal memories 32A and 32B. By changing the data read order from the memories 32A and 32B, picture data are read in the unit of a macroblock 43 of (16×8) pixels according to JPEG. Data 43 of macroblock are encoded by the encoding section 26. As a result, JPEG data 44 corresponding to picture data of the block 42 are obtained. A data block 45 of JPEG data corresponds to the macro block 43.

The area 41 of the original picture is processed as described above. As a result, JPEG data 46, each of which corresponds to six blocks, are generated. When the JPEG data are decoded in this order, a decoded picture 47 is obtained. However, since the order of blocks of the decoded picture 47 is different from that of the area 41 of the original picture, the decoded picture 47 is different from the original picture.

Thus, the code rearrangement section 34 rearranges the blocks of the JPEG data 46 in the regular order and generates JPEG data 48. When the JPEG data 48 are decoded in this order, a decoded picture 49 whose block order matches that of the area 41 of the original picture can be obtained.

Figure 14:
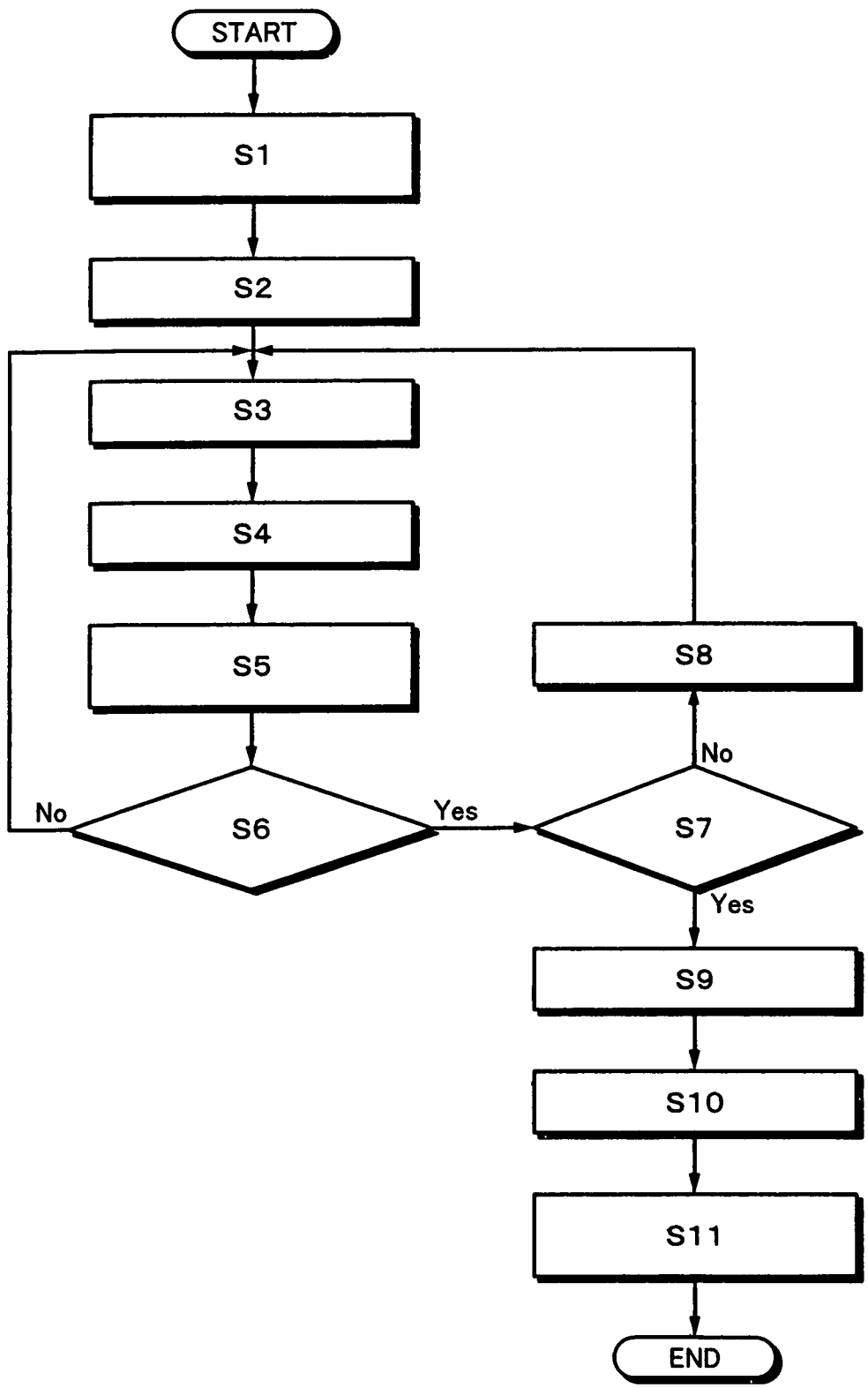
FIG. 14 is a flow chart describing a picture process according to an embodiment of the present invention.

FIG. 14 is a flow chart showing a picture process according to the present invention. The process shown in the flow chart is executed under the control of a computer that controls the signal processing section such as the CPU 11 (see FIG. 8). At step S1, a picture is read from the memory in the unit of a block. In the example shown in FIG. 13, one block is composed of (64×4) pixels.

At step S2, a picture process, for example, an enlargement process that doubles the height and width of an original picture, is performed. At step S3, the enlarged data of (128×8) pixels that have been enlarged are input to the encoding section 26 in the unit of a macroblock of (16×8) pixels. At step S4, the encoding section 26 encodes picture data in their input order.

At step S5, encoded data, for example JPEG data, are written to the memory. At step S6, it is determined whether or not block data, for example data of (128×8) pixels, have been processed. When the block data have not been completely processed, the flow returns to step S3. Thereafter, the encoding process (step S3 to step S5) is repeated.

When the determined result at step S6 denotes that the process for the data of the block has been completed, the flow advances to step S7. At step S7, it is determined whether or not the process for the entire enlarged picture has been completed. When the process has not been completed, the flow advances to step S8. At step S8, a predetermined delimiter code having a predetermined value is inserted. In other words, a delimiter code is inserted to delimit each block of the JPEG data.

Stuffing bits are added such that JPEG data of one block that has been encoded with a variable length code has a length that is an integer multiple of one byte. Thereafter, a delimiter code (16 bits) is added. FIG. 15A shows an example of JPEG data. JPEG MCU (Minimum Coded Unit) as a minimum encoding unit is data that generate corresponding to a macroblock. Since JPEG MCU has been encoded with Huffman code, JPEG MCU has a variable bit length.

The minimum encoding unit may not match the rearrangement unit. When a macroblock of (2×2) is a picture process unit, the number of macroblocks in the JPEG encoding direction, namely the horizontal direction, is two. Thus, two macroblocks become a rearrangement unit. In FIG. 15A and FIG. 15B, it is assumed that one block is composed of two macroblocks. As shown in FIG. 15B, stuffing bits of 6 bits are added to each of JPEG data, JPEG MCU1 and JPEG MCU2, of two macroblocks. Thus, with (17+25+6=48 bits=6 bytes), JPEG data of a block become an integer multiple of one byte. After the stuffing bits, a delimiter code of 16 bits is inserted.

Thus, a delimiter code represents delimitation of a rearrangement unit. This delimitation is referred to as ECS (Entropy Coded Segment). Thus, the rearrangement is performed in the unit of an ECS. A DC coefficient of JPEG data transfers data of the difference between the DC coefficient of the current data block and the DC coefficient of the preceding data block. Data of a DC coefficient preceded by a delimiter code is the value of the DC coefficient, not the difference.

When the determined result at step S7 denotes that the entire enlarged picture has been completely processed, the flow advances to step S9. At step S9, JPEG data are read from the memory. At step S10, JPEG data are rearranged in the unit of a block. At step S11, the rearranged JPEG data are written to the memory.

The foregoing embodiment of the preset invention is applied to JPEG. Likewise, the present invention can be applied to MPEG as an encoding method. In this case, a slice start code having a predetermined value as a delimiter is inserted into MPEG data corresponding to one block of a picture.

Figure 16A:
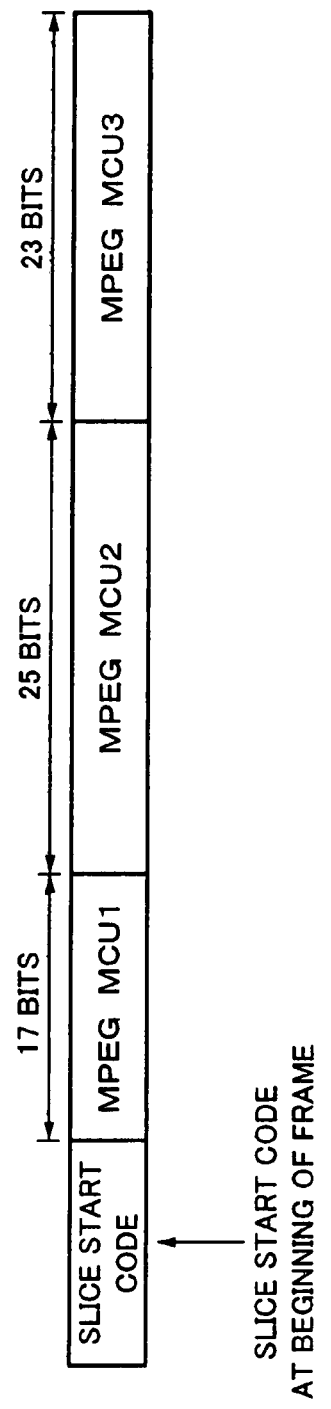
FIG. 16A and FIG. 16B are schematic diagrams describing a slice start code insertion process according to an embodiment of the present invention.
Figure 16B:
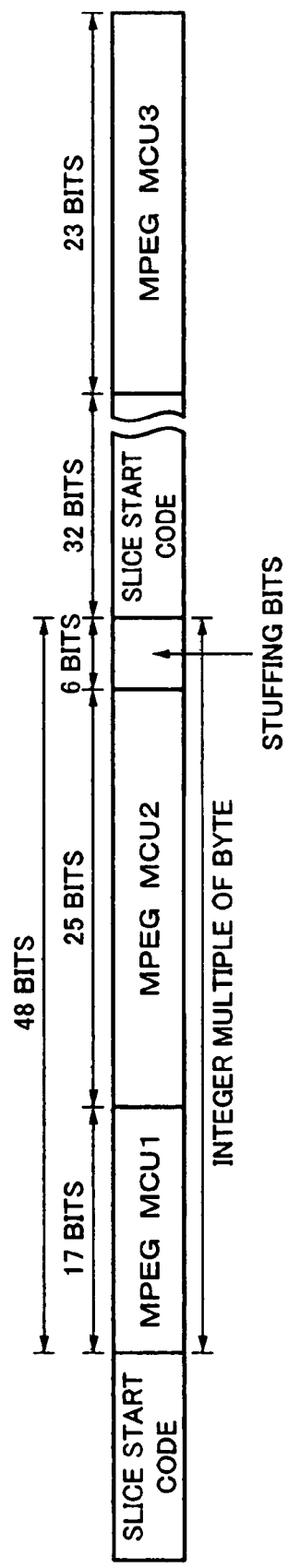

Next, with reference to FIG. 16A and FIG. 16B, insertion of a slice start code will be described. FIG. 16A shows a stream of MPEG data. For simplicity, two data blocks corresponding to two macro blocks correspond to one block of picture data. As shown in FIG. 16B, stuffing bits of 6 bits are added to each of two macro blocks of MPEG data. Thus, with (17+25+6=48 bits=6 bytes), a block of MPEG data becomes an integer multiple of one byte. After the stuffing bits, a slice start code of 32 bits is inserted.

It is necessary to rewrite the value of the delimiter code (JPEG), which represents delimitation of variable length data of a block, and the value of the slice start code (MPEG) as the rearrangement process is performed. The delimiter code is defined as H'FFDx (where H' represents hexadecimal notation and x represents a remainder of which the number of delimiter codes is divided by 8). The slice start code is defined as H'000001xx (where H' represents hexadecimal notation and xx represents the value of the vertical position of a macroblock of a slice picture). It is necessary to change x and xx such that they comply with the standard when macroblocks are rearranged.

Figure 17:
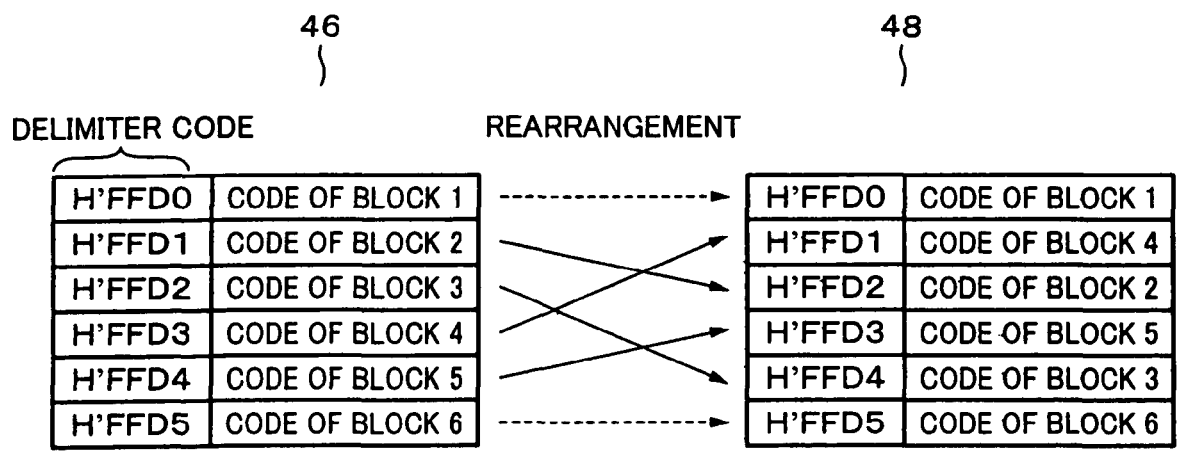
FIG. 17 is a schematic diagram describing a delimiter code rewriting process according to an embodiment of the present invention.

FIG. 17 shows a delimiter code rewriting process. As described with reference to FIG. 13, JPEG data 46 corresponding to six blocks are generated. As shown in FIG. 17, to delimit the blocks of the JPEG data 46, delimiter codes H'FF0 to H'FFD5 are inserted, respectively.

As represented by arrows of FIG. 17, the code rearrangement section 34 rearranges blocks of the JPEG data 46 and generates JPEG data 48. The delimiter codes are rewritten corresponding to the rearranged result. The code of the fourth block of the JPEG data 46 is rearranged to the code of the second block of the JPEG data 48. Thus, the delimiter code H'FFD3 is rewritten to the delimiter code H'FFD1.

Although FIG. 17 shows the delimiter code rewriting process, the values of xx of slice start codes inserted into an MPEG stream are rewritten corresponding to the rearranged blocks.

FIG. 18A and FIG. 18B describe an example of which the code rearrangement section 34 performs a process that deletes a delimiter code. FIG. 18A shows the case that a delimiter code is inserted in the unit of JPEG MCUs of one block like the JPEG data stream shown in FIG. 16B. To reduce the influence of the increase of the redundancy due to the insertion of the delimiter code, the delimiter code is deleted as a stream shown in FIG. 18B. It may be necessary to delete a delimiter code to prevent violation against the JPEG standard.

However, since DC coefficient DC1 of JPEG MCU3 corresponding to the first macro block after a delimiter code is the difference with 0, namely the value of DC coefficient DC1, in the stream of which a delimiter code is deleted in FIG. 18B, the DC coefficient of the first macroblock of JPEG MCU3 necessarily becomes the difference with the DC coefficient of the last macroblock of the preceding JPEG MCU2.

Next, three types of methods of the delimiter code deletion process will be described. FIG. 19 shows the first method. In this method, when data are encoded, it is necessary to correlatively record or store the start position or end position of JPEG MCU2 (hereinafter simply represented by MCU2) or the number of stuffing bits and the DC component of MCU2 as the minimum encoding unit immediately preceding the delimiter code. Thus, encoded data of a DC component can be rewritten without necessity of decoding many codes. As a method of recording or storing these data, they may be inserted into a stream or stored in the memory.

At step S21, a new start position a of MCU3 after deletion of the delimiter code is calculated on the basis of the start position or end position of MCU2 or the number of stuffing bits that have been recorded. The position a matches the end position of MCU2. With the start position of MCU2, after data are decoded, a code at the end of data of one macroblock is detected. As a result, the end position of MCU2 is obtained. When a delimiter code is detected, the end position of MCU2 is obtained based on the number of stuffing bits.

At step S22, the DC component of MCU3 is decoded. Since the DC component of MCU3 transfers data of which an absolute value has been encoded, the DC component can be decoded and obtained. The difference between the DC component of MCU2 that has been recoded and the decoded DC component of MCU3 is calculated. The difference is encoded with Huffman code. As a result, encoded data of the DC component of MCU3 are obtained.

At step S24, MCU3 is placed from the new start position a. Thus, the stuffing bits and the delimiter code are deleted. The encoded data of the DC component of MCU3 are data of which the difference has been encoded and are different from the encoded data (absolute value) of the DC component of MCU3 before the deletion of the stuffing bits and the delimiter code in bit length.

Figure 20:
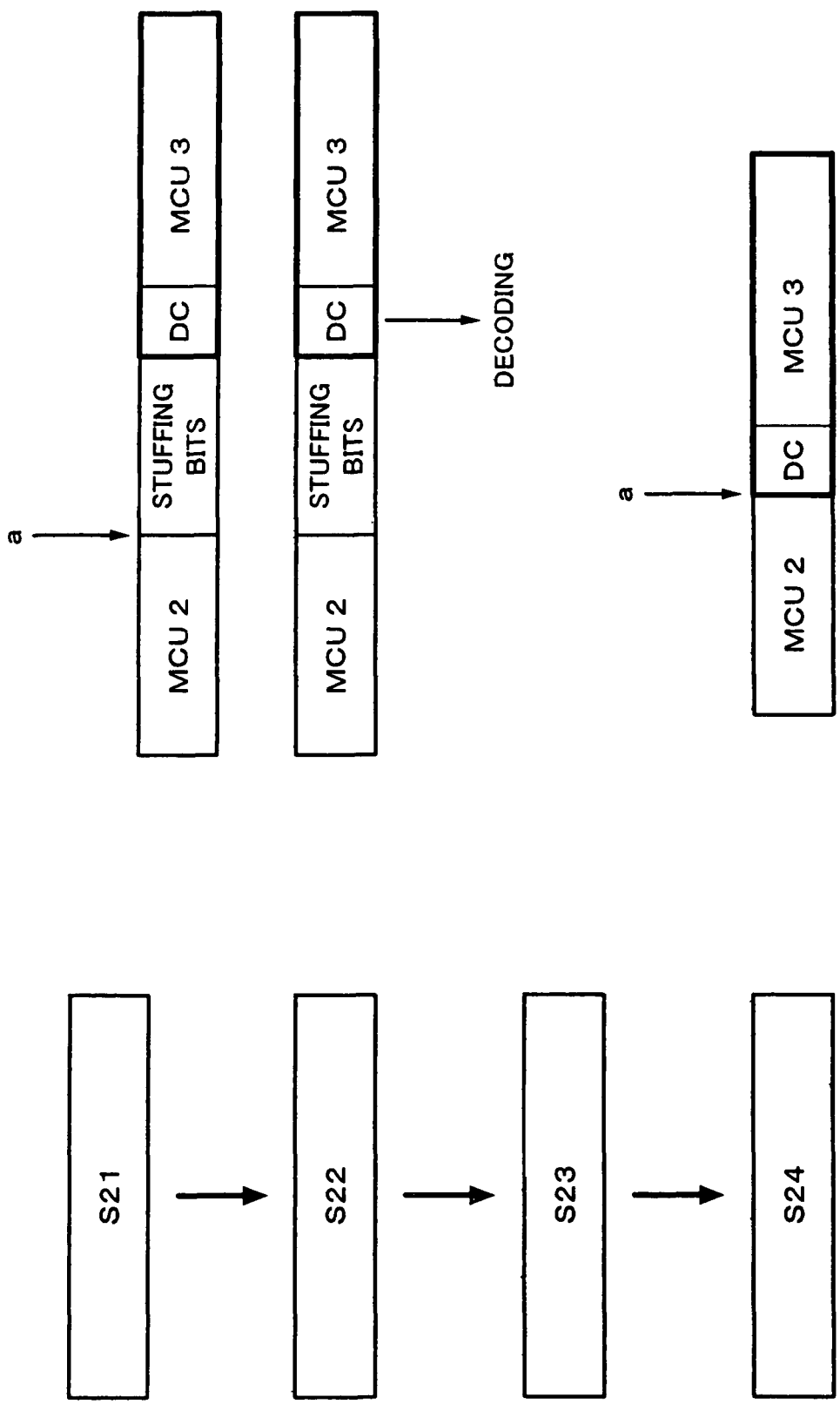
FIG. 20 is a schematic diagram describing a method of a stuffing bit deletion process according to an embodiment of the present invention.

As shown in FIG. 20, the first method can be applied in the case that a delimiter code is not inserted, when stuffing bits are inserted and the differential prediction value of the DC component is 0, namely encoded data of the DC component of MCU3 are encoded data of the value of the DC component. The encoded data of the DC component of MCU3 are data of which the difference has been encoded. In the case that a delimiter code is not inserted, the second method and the third method that will be described later can be applied in the same manner.

FIG. 21 shows the second method of the delimiter code deletion process. In the second method, when data are encoded, a start position b of MCUX and data that are transmitted or recorded are correlatively recorded or stored. However, unlike the first method, the DC component of MCU2 is not recorded. MCUX is a dummy minimum encoding unit immediately preceding stuffing bits. MCUX is preferably a minimum encoding unit of which a macroblock composed of only a DC coefficient of a predetermined pixel value is encoded according to JPEG. The value of a DC component of a full black picture is for example 0. As another example, data of which the values of luminance data Y and color difference data Cr and Cb are 0 may be used.

At step S31, the new start position b of MCU3 that matches the start position of MCUX is obtained. At step S32, the DC component of MCUX and the DC component of MCU3 are decoded. The encoded data of the DC component of MCUX are data of which the difference that follows has been encoded. Thus, the value of which the encoded data of the DC component of MCUX are decoded is the DC component of MCU2. Thus, it is not necessary to calculate the difference.

Encoded data of DC component of MCUX=encoded data of (DC component of MCUX (for example, 0)–DC component of MCU2)

At step S33, the DC component of MCUX that has been decoded, namely the difference between –(DC component of MCU2) and the DC component of MCU3, is obtained and the difference is encoded. As a result, encoded data of the DC component of the new MCU3 are obtained. At step S34, data after MCU3 are placed from the new start position b. Thus, the stuffing bits and the delimiter code are deleted.

FIG. 22 shows the third method of the delimiter code deletion process. In the third method, it is not necessary to decode encoded data of a DC component. In addition, after MCU3, MCU4 is placed. Thus, the process is simplified.

In the third method, when data are encoded, the start position or end position or MCU3 or the number of stuffing bits and data that are transferred or recorded are correlatively recorded or stored. In the data that are transferred or recorded, after MCU2, MCU3 is inserted. Immediately after a delimiter code, MCU3' is inserted. Encoded data of the DC component of MCU3 are encoded data of the difference between the DC component of MCU2 and the DC component of MCU3. In contrast, the encoded data of the DC component of MCU'3 are placed immediately after the delimiter code. Thus, the encoded data of the DC component of MCU'3 are the value of the DC component itself.

At step S41, based on the start position or end position of MCU3 or the number of stuffing bits, a new start position c of MCU4 is calculated. The end position of MCU3 matches the start position of MCU4. Data may be decoded after the start position of MCU3. The position of EOB may be detected as the end position of MCU3. Since the position of the delimiter code has been obtained, based on the number of stuffing bits, the position c may be obtained. At step S42, after MCU3, MCU4 and so forth are placed from the new start position.

Figures 23A, 23B:
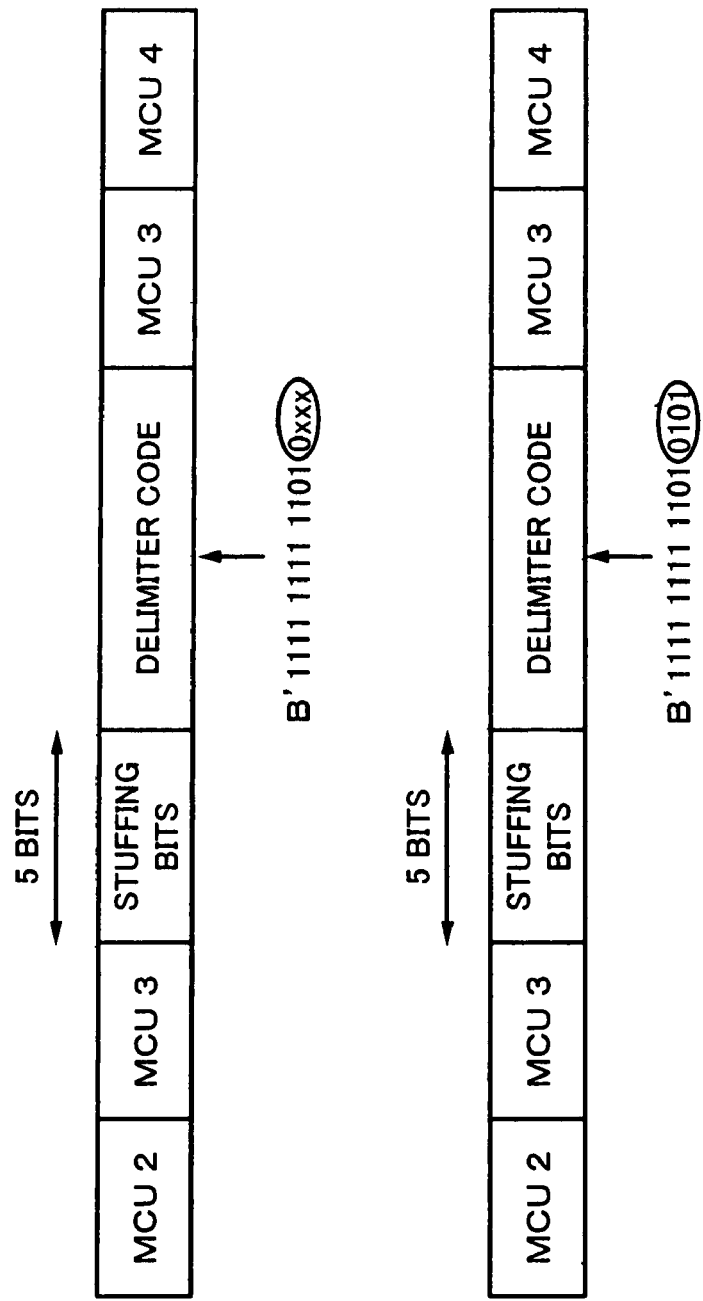
FIG. 23A and FIG. 23B are schematic diagrams describing an example of a method of recoding the number of stuffing bits necessary for the delimiter code deletion process according to an embodiment of the present invention.

In the first method shown in FIG. 19 or the third method shown in FIG. 22, it is necessary to record the number of stuffing bits. FIG. 23A and FIG. 23B show a method of recording the number of stuffing bits in a stream. As shown in FIG. 23A, the delimiter code is defined as H'FFDx (where H' represents hexadecimal notation and x represents the value of the remainder of which the number of delimiter codes is divided by 8).

The value of x ranges from 0 to 7. Thus, as shown in FIG. 23B, in the case that the number of stuffing bits is 5, the number of stuffing bits can be recorded as the value x in the stream. In this process, although a stream that does not comply with the standard is generated, since a delimiter code is deleted from a stream that is output, as described above, no problem occurs.

FIG. 24A, FIG. 24B, and FIG. 24C show a rearrangement process that allows the start position of each rearrangement unit in a JPEG data stream that is generated to become clear. FIG. 24A shows an example of JPEG data and data of which they have been rearranged. Since JPEG data of blocks of picture data have a variable length, when they are rearranged, their start positions become unclear. FIG. 24B shows an arrangement of blocks of a corresponding original picture. When the rearranged JPEG data are decoded, a picture shown in FIG. 24B can be obtained.

When blank memory areas are formed as shown in FIG. 24C, the start positions of first, third, and fifth data blocks of JPEG data stored in the memory are placed at a predetermined interval L. In the rearrangement process, when the start positions of the third and fifth data blocks are obtained, the rearrangement process can be easily performed at high speed. While the data blocks are being rearranged, the start positions of the fourth and sixth data blocks can be determined. Since the blank areas are areas in which data are not written, they may contain any data.

FIG. 25 shows an example of a structure that is considered to generate a reduced picture (so-called a thumbnail). A picture to be processed has been stored in a picture memory 51. The picture memory 51 has for example two areas that have an overlapped portion. Disposed downstream the picture memory 51 is a picture processing section 52. As described above, the picture processing section 52 performs processes such as a picture size changing process, a chromatic aberration correction process, and a distortion correction process.

The output order of picture data that the picture processing section 52 processes is different from the regular process direction defined in JPEG. The picture processing section 52 successively supplies processed data to an encoding section 53. The encoding section 53 encodes the data according to for example JPEG. The encoding section 53 outputs an encoded picture whose order is different from the regular direction defined in JPEG.

A rearrangement section 55 rearranges the encoded picture 54 in the regular direction defined in JPEG. The rearrangement section 55 outputs JPEG data rearranged in the regular process direction defined in JPEG to an external memory 56. The external memory 56 stores the JPEG data in the regular process direction defined in JPEG. Thus, when the JPEG data are decoded by a decoder structured according to the JPEG standard, the picture can be correctly restored.

In the example shown in the drawing, a picture is divided into two portions having an overlapped portion and input to the picture processing section 52. Thus, the processed results have an overlapped portion. Pictures from which the overlapped portions are removed are transferred to the encoding section 53. To generate a reduced picture, pre-encoded data are obtained from the output side of the picture processing section 52 and supplied to a reduction section 57. In this case, in the reduction process, for example filtering using a decimating filter, it is necessary to keep the overlapped portions. The reduction section 57 reduces the two areas and generates a reduced picture 58. In the structure shown in FIG. 24A, FIG. 24B, and FIG. 24C, when a picture is read from the picture memory 51 one time, not only the picture can be encoded, but a reduced picture can be generated.

Figure 26:
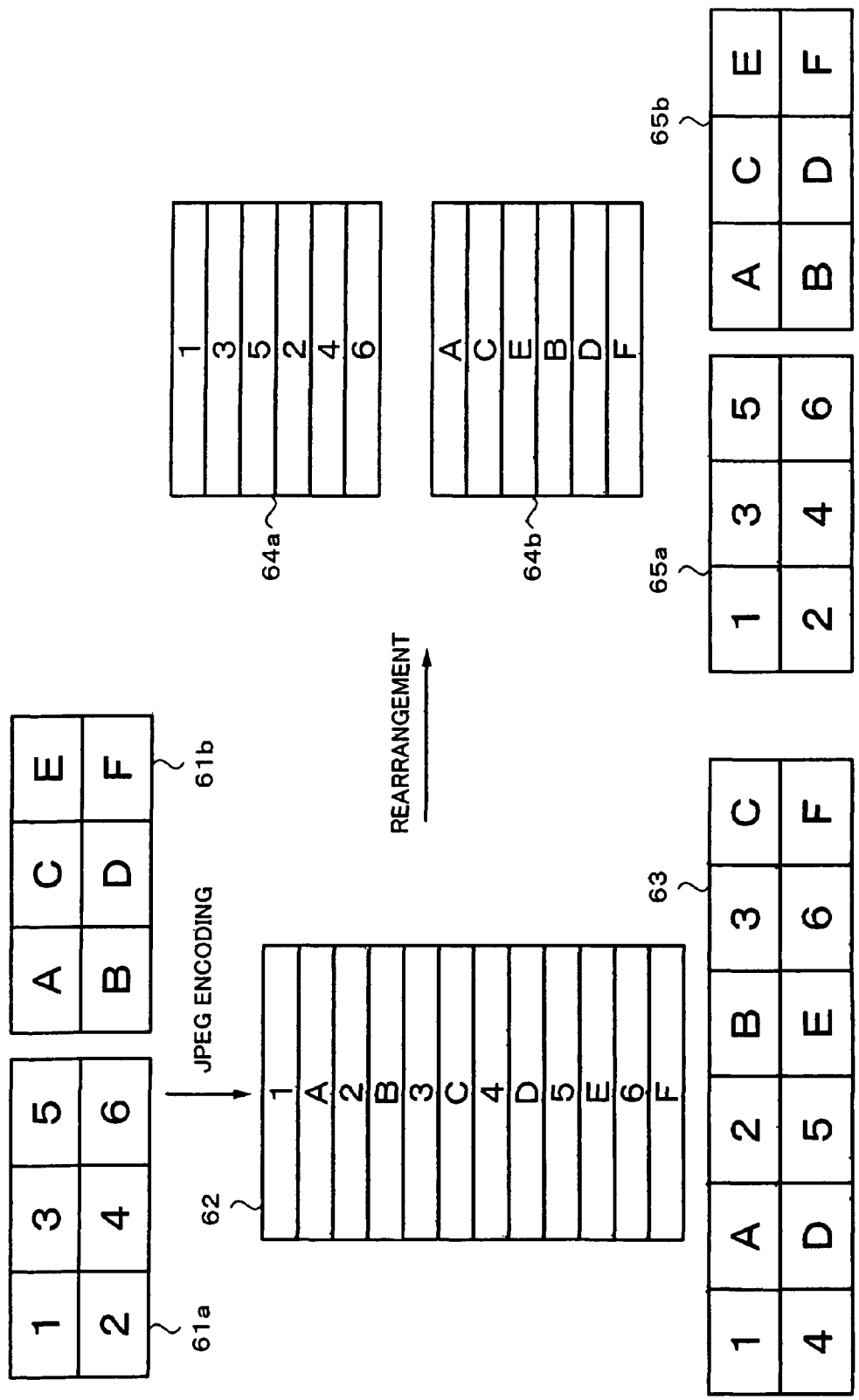
FIG. 26 is a schematic diagram showing the case of which the present invention is applied to a process for two pictures.

FIG. 26 shows a process in which one encoding section encodes a plurality of pictures, for example, two pictures 61a and 61b, at the same time. The encoding section encodes each of six blocks into which each picture is divided according to JPEG. In the JPEG encoding, blocks of these pictures are alternately encoded and thereby encoded data 62 are obtained. A picture 63 corresponds to the encoded data 62.

The encoded data 62 are rearranged. As represented by corresponding pictures 65a and 65b, the encoded data 62 are rearranged and separated such that the order of blocks of the pictures 65a and 65b matches the order of blocks of the original pictures. After the rearrangement and separation, encoded data 64a and 64b are generated. The structure shown in FIG. 26 is advantageous when the process of the encoding section is faster than the process of the picture processing section disposed upstream thereof or when a plurality of small size pictures are generated at the same time.

Figure 27:
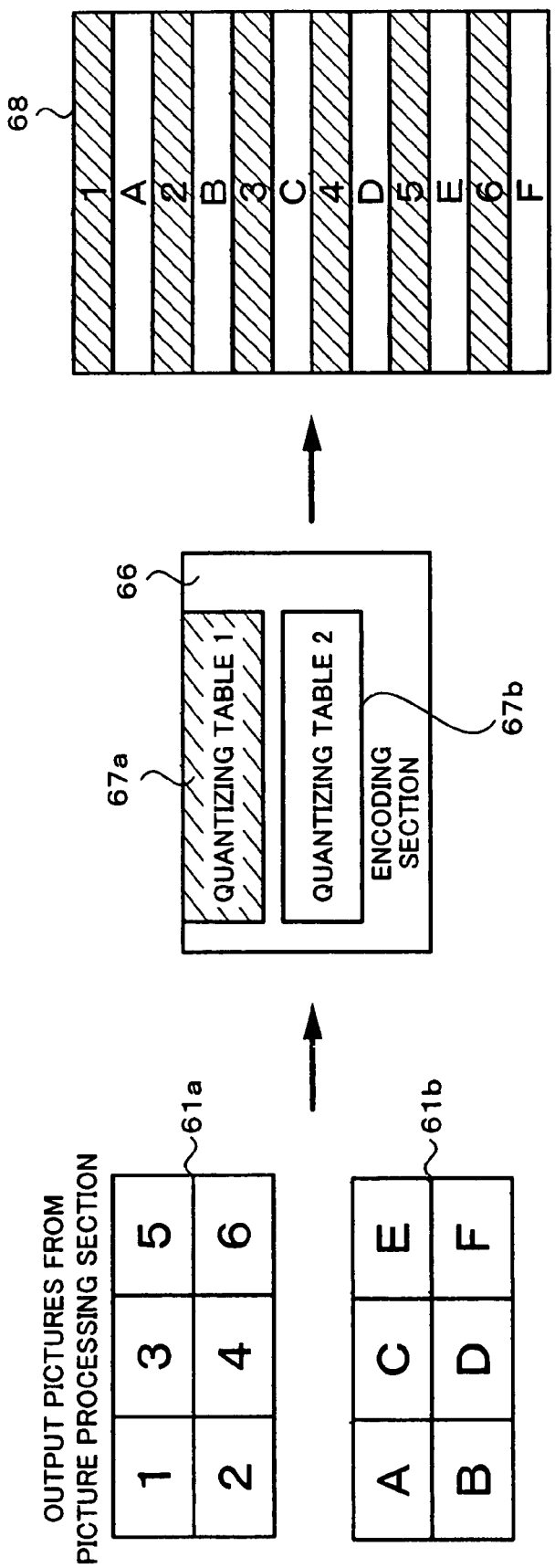
FIG. 27 is a schematic diagram showing an example of a modification of which the present invention is applied to a process for two pictures.

When the two pictures 61a and 61b are encoded by an encoding section 66 at the same time, as shown in FIG. 27, their encoding characteristics, for example quantizing characteristics, may become different. For the picture 61a, a quantizing table 67a being hatched is used; for the picture 61b, a quantizing table 67b is used. The encoding section 66 outputs JPEG data 68. Instead, different Huffman tables may be used for the pictures 61a and 61b.

Figure 28:
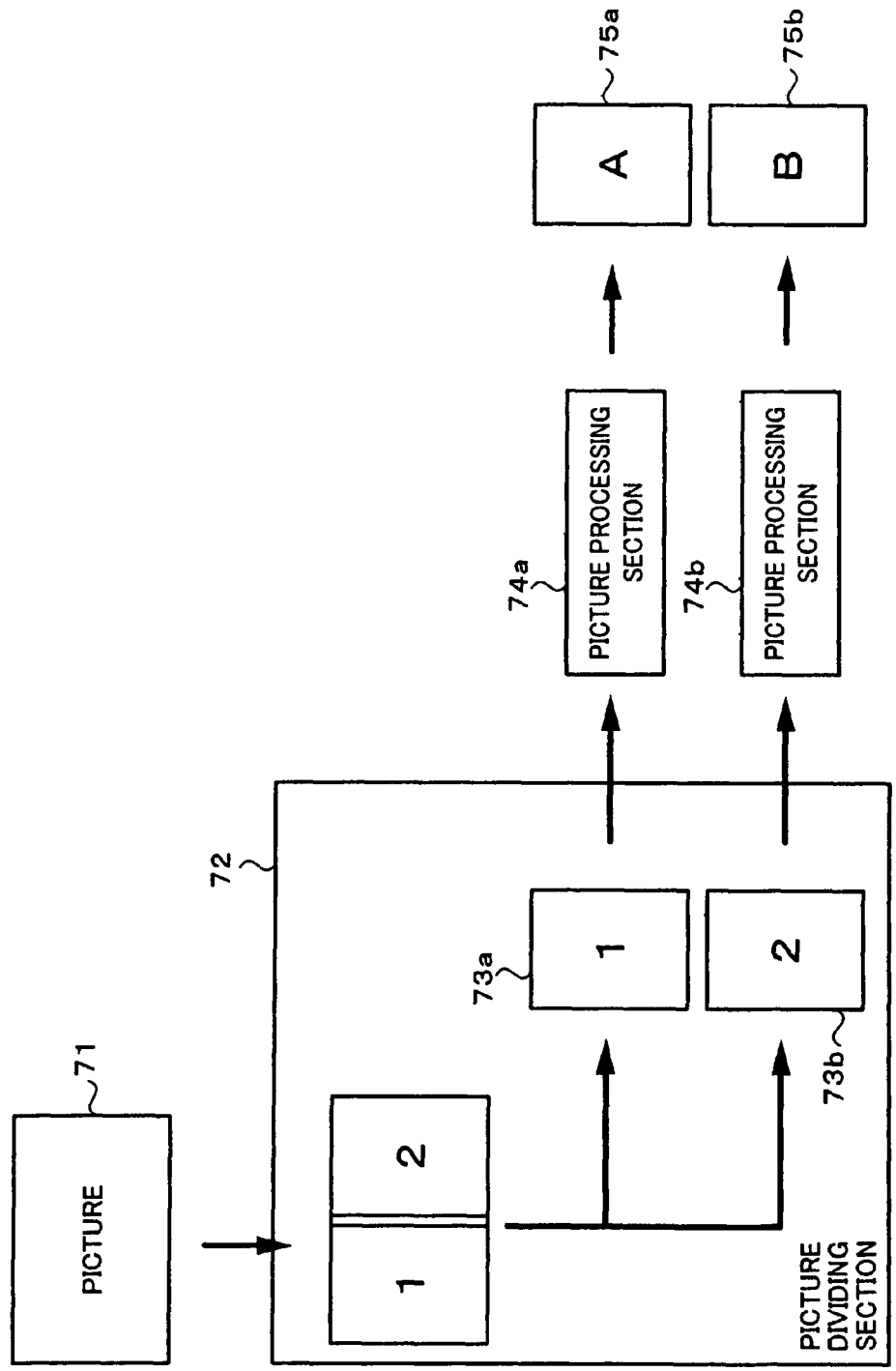
FIG. 28 is a schematic diagram describing an example of which the present invention is applied to the case of which one picture is divided and the divided pictures are processed.

FIG. 28 shows an example of which two processing sections (a picture processing section and a encoding section) process one picture. In this example, since picture processing section 74a and 74b necessitate overlapped portions, a picture dividing section 72 divides one picture 71 into pictures 73a and 73b such that they have an overlapped portion with a predetermined width. When the overlapped portions are not necessary, they can be omitted.

The divided pictures 73a and 73b outputted from the picture dividing section 72 are supplied to the picture processing sections 74a and 74b, respectively. The picture processing sections 74a and 74b output processed pictures 75a and 75b corresponding to the divided pictures 73a and 73b, respectively. The processed pictures 75a and 75b do not have an overlapped portion.

Figure 29:
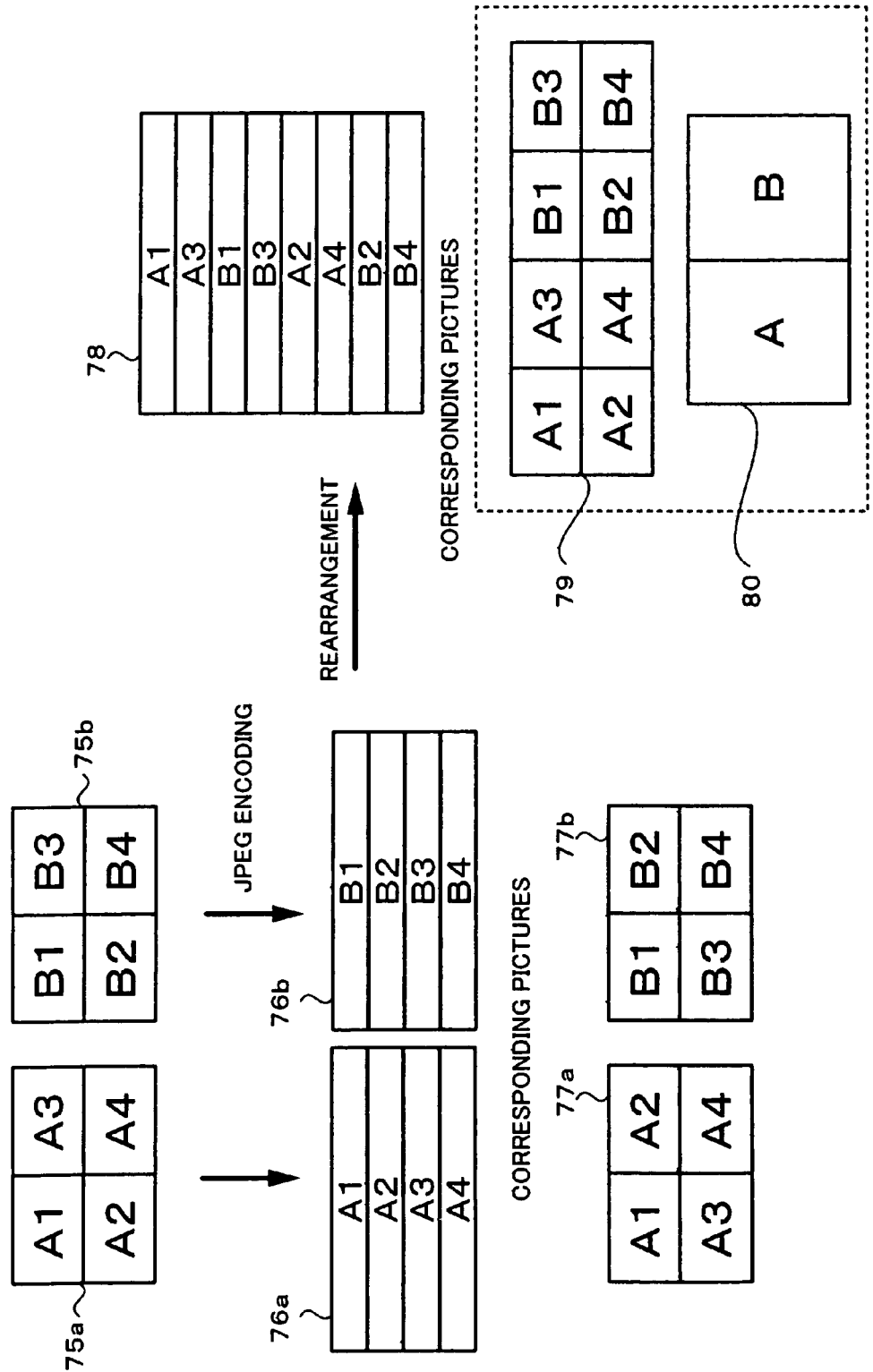
FIG. 29 is a schematic diagram describing an example of which the present invention is applied to the case of which one picture is divided and the divided pictures are processed.

As shown in FIG. 29, the processed pictures 75a and 75b are output to the different encoding sections in the unit of a block in the order of A1, A2, A3, A4, B1, B2, B3, and B4. Each encoding section encodes the blocks in their input order. From each encoding section, JPEG data 76a and 76b are obtained. The block order of the JPEG data 76a and 76b does not match the regular block order defined in JPEG as represented by corresponding pictures 77a and 77b.

The rearrangement section combines the JPEG data 76a and 76b into JPEG data and rearranges the blocks of the JPEG data 76a and 76b. As represented by corresponding pictures 79 and 80, their block order matches the block order of the original picture. In addition, the blocks of the JPEG data 76a and 76b are rearranged such that the two pictures are combined corresponding to the original picture. The corresponding picture 79 is a picture based on a pre-encoding format. The corresponding picture 80 is a picture based on a post-encoding format. In the rearrangement, delimiter codes may be deleted in the foregoing method or may be kept.

In the structure or process shown in FIG. 28 and FIG. 29, even if the process performance of one picture processing section is insufficient, when a plurality of picture processing sections are used, the process performance can be improved. In this example, one picture is divided into a left picture and a right picture. Instead, one picture may be divided into an upper picture and a lower picture or into an upper picture, a lower picture, a left picture, and a right picture.

Next, an example of which a picture rotation process and a rearrangement process are performed step by step according to an embodiment of the present invention will be described. First of all, rearrangement in a picture rotation process and an inversion process will be defined.

A rotation of 90 degrees is defined as rearrangement from matrix A having n lines and m rows into matrix B having m lines and n rows that satisfies bij=a(n+1−j)i. Each element of matrixes A and B corresponds to one pixel of a picture or one block composed of a plurality of pixels.

$$A = \begin{pmatrix} a_{11} & \cdots & a_{1m} \\ \vdots & & \vdots \\ a_{n1} & \cdots & a_{nm} \end{pmatrix}$$

$$B = \begin{pmatrix} b_{11} & \cdots & b_{1n} \\ \vdots & & \vdots \\ b_{m1} & \cdots & b_{mn} \end{pmatrix} = \begin{pmatrix} a_{n1} & \cdots & a_{11} \\ \vdots & & \vdots \\ a_{nm} & \cdots & a_{1m} \end{pmatrix}$$

A rotation of 180 degrees is defined as rearrangement from matrix A having n lines and m rows to matrix B having m lines and n rows that satisfies bij=a(n+1−i)(m+1−j).

$$B = \begin{pmatrix} b_{11} & \cdots & b_{1m} \\ \vdots & & \vdots \\ b_{n1} & \cdots & b_{nm} \end{pmatrix} = \begin{pmatrix} a_{nm} & \cdots & a_{n1} \\ \vdots & & \vdots \\ a_{1m} & \cdots & a_{11} \end{pmatrix}$$

A rotation of 270 degrees is defined as rearrangement from matrix A having n lines and m rows to matrix B having m lines and n rows that satisfies bij=aj(m+1−i).

$$B = \begin{pmatrix} b_{11} & \cdots & b_{1n} \\ \vdots & & \vdots \\ b_{m1} & \cdots & b_{mn} \end{pmatrix} = \begin{pmatrix} a_{1m} & \cdots & a_{nm} \\ \vdots & & \vdots \\ a_{11} & \cdots & a_{n1} \end{pmatrix}$$

A horizontal mirror inversion is defined as rearrangement from matrix A having n lines and m rows to matrix B having m lines and n rows that satisfies bij=ai(m+1−j).

$$B = \begin{pmatrix} b_{11} & \cdots & b_{1m} \\ \vdots & & \vdots \\ b_{n1} & \cdots & b_{nm} \end{pmatrix} = \begin{pmatrix} a_{1m} & \cdots & a_{11} \\ \vdots & & \vdots \\ a_{nm} & \cdots & a_{n1} \end{pmatrix}$$

A vertical mirror inversion is defined as rearrangement from matrix A having n lines and m rows to matrix B having m lines and n rows that satisfies bij=a(n+1−i)j.

$$B = \begin{pmatrix} b_{11} & \cdots & b_{1m} \\ \vdots & & \vdots \\ b_{n1} & \cdots & b_{nm} \end{pmatrix} = \begin{pmatrix} a_{n1} & \cdots & a_{nm} \\ \vdots & & \vdots \\ a_{11} & \cdots & a_{1m} \end{pmatrix}$$

Figure 30:
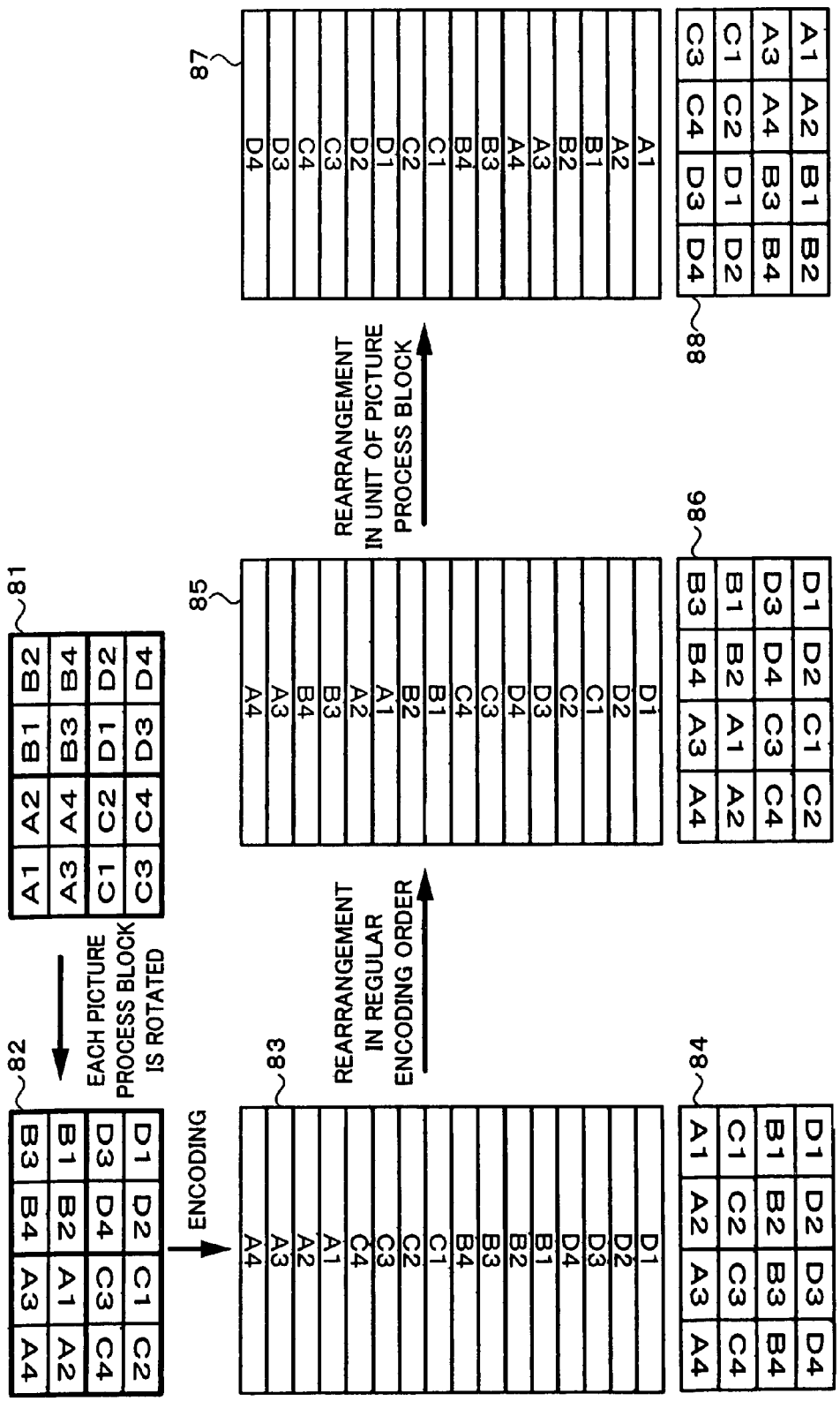
FIG. 30 is a schematic diagram describing an example of which the present invention is applied to a vertical and horizontal mirror-inversion process for a picture.

Next, with reference to FIG. 30, for a picture rotation process, an example of a process that rotates a picture by 180 degrees, namely a process that vertically and horizontally mirror-inverts a picture, will be described. It is assumed that an original picture 81 is composed of four picture process block and each picture process block is composed of four encoded block. For example, A1, A2, A3, A4, and so forth represent encoded blocks. Encoded blocks A1 to A4 compose one picture process block. Likewise, encoded blocks B1 to B4, C1 to C4, and D1 to D4 compose a picture process block.

As a first stage process, each picture process block of the original picture 81 is rotated by 180 degrees. As a result, a picture 82 is formed. In the picture process block composed of encoded blocks A1 to A4, the positions of two encoded blocks A1 and A4 that are diagonally placed are replaced with each other and the positions of two encoded blocks A2 and A3 that are diagonally placed are replaced with each other. As a result, the positions of pixels are vertically and horizontally mirror-inverted. The rearrangement process can be accomplished by controlling addresses of encoded blocks of the picture 81 that are stored to the memory and read therefrom. In addition, while a picture process is being performed, the rearrangement process can be performed.

The picture 82 whose picture process blocks have been rotated is successively input to the encoding section in the unit of a picture process block (A4, A3, a2, A1, C4, C3, and so forth). The encoding section encodes each picture process block according to JPEG and generates JPEG data 83. A picture 84 represents a picture whose data order matches the data order of the JPEG picture 83.

Since the corresponding picture 84 is different from the picture 82, as a second stage process, the JPEG data 83 are rearranged such that they have the regular encoding order. As a result, JPEG data 85 are obtained. Although a corresponding picture 86 has the same data arrangement as the picture 82, the picture 86 is not a picture that has been vertically and horizontally mirror-inverted.

Thus, as a third stage process, the picture process blocks are rearranged such that the picture is vertically and horizontally mirror-inverted. As a result, JPEG data 87 are obtained. In other words, each picture process block is treated as one element of a matrix in the definition of the rotation. When the JPEG data 87 are arranged in the regular encoding order, a picture of which the original picture 81 is vertically and horizontally mirror-inverted can be obtained as represented by a corresponding picture 88.

Figure 31:
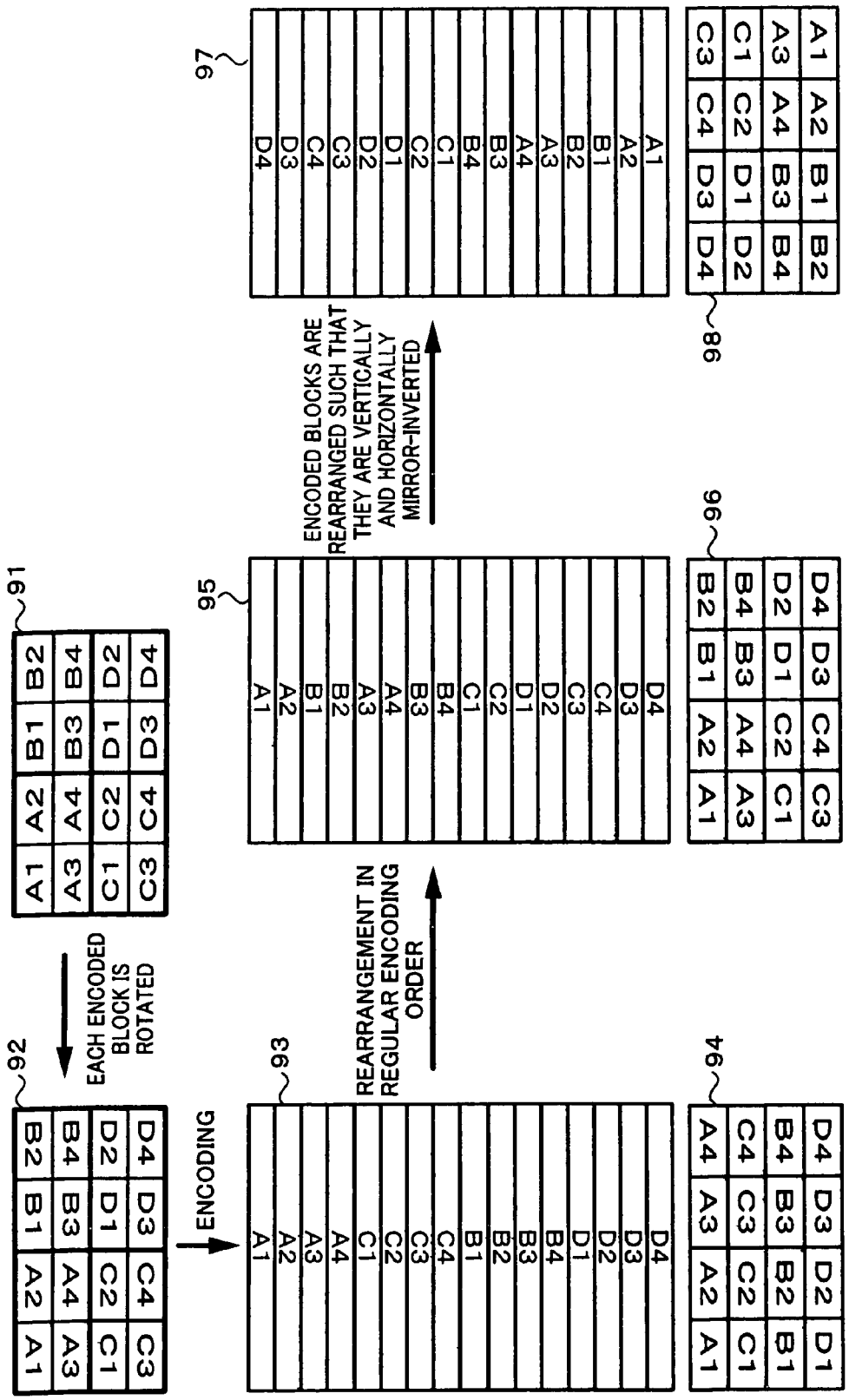
FIG. 31 is a schematic diagram describing another example of which the present invention is applied to the vertical and horizontal mirror-inversion process for a picture.

FIG. 31 shows another example of the process that vertically and horizontally mirror-inverts a picture. An original picture 91 is the same as the original picture 81 shown in FIG. 30. As a first stage process, each encoded block is vertically and horizontally mirror-inverted. As a result, a picture 92 is obtained. The first stage process is performed while the picture process is being performed.

The encoding section encodes the picture 92 as a processed result and obtains JPEG data 93. A picture 94 represents a picture whose data order matches the data order of the JPEG data 93. Since the picture 94 is different from the picture 92, as a second stage process, the JPEG data 93 are rearranged in the regular encoding order. As a result, JPEG data 95 are obtained. Although a corresponding picture 96 has the same data arrangement as the picture 92, the picture 96 is not a picture of which the picture 92 has been vertically and horizontally mirror-inverted.

Thus, as a third stage process, each encoded block is rearranged such that the picture is vertically and horizontally mirror-inverted. As a result, JPEG data 97 are obtained. In other words, each encoded block is treated as one element of a matrix in the definition of the rotation. When the JPEG data 97 are arranged in the regular encoding order, a picture of which the original picture 91 is vertically and horizontally mirror-inverted is obtained as represented by a corresponding picture 98.

An example of a rotation of 180 degrees was specifically described. Other processes such as a rotation of 90 degree and a vertical mirror inversion can be performed in the same manner.

Figure 32:
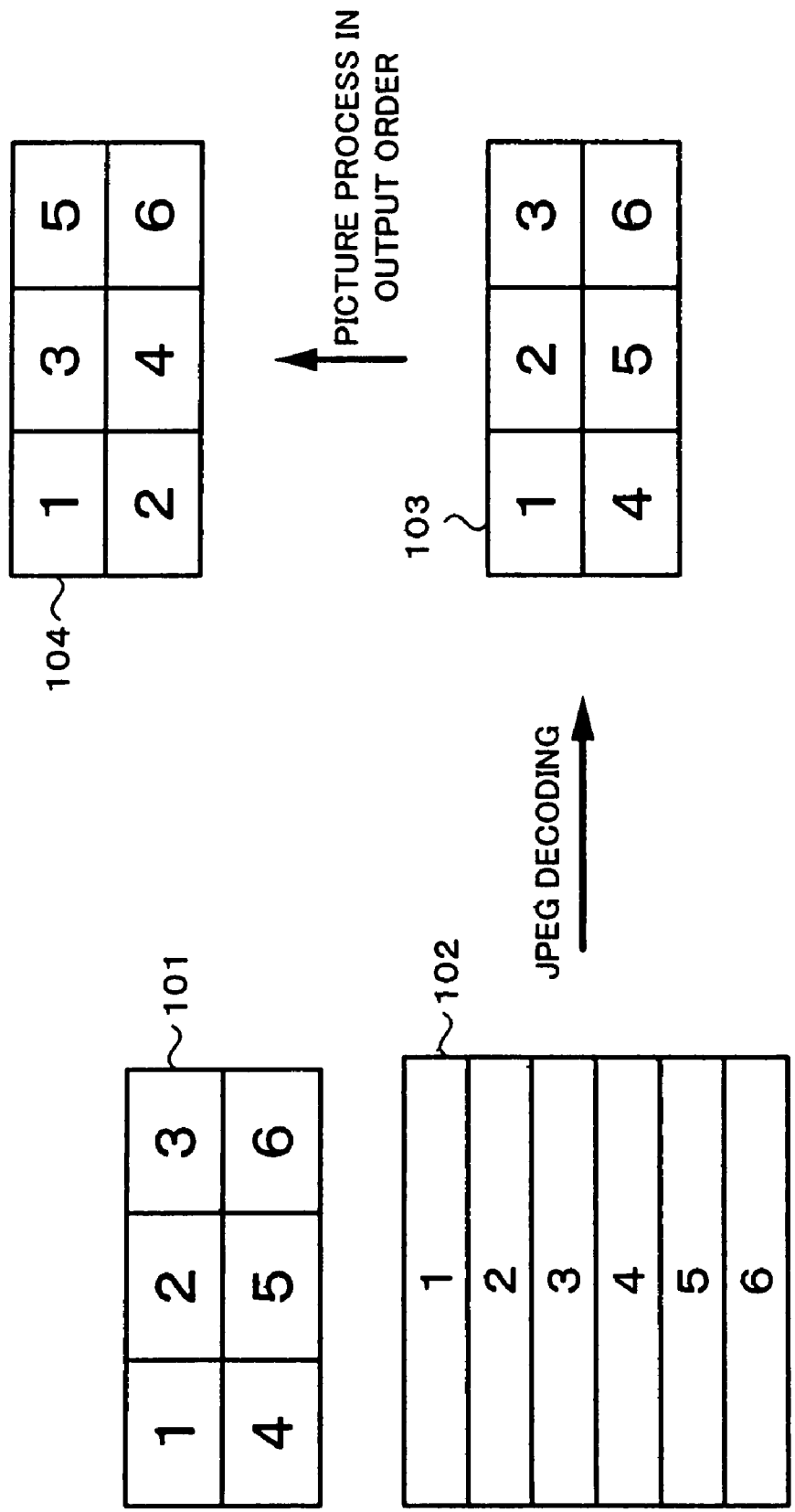
FIG. 32 is a schematic diagram describing an example of a reference of a process on a decoding side.

Next, the case of which encoded data that have been rearranged in the foregoing manner are decoded will be described. FIG. 32 shows a process that decodes encoded data without rearranging them. An original picture 101 is processed in the order of (1 4→2→5→3→6). The processed picture is encoded in the normal JPEG encoding order of (1→2→3→4→5→6). As a result, JPEG data 102 are obtained. The JPEG data 102 are transferred to the decoding side without rearrangement.

The decoding side performs a picture process for the decoded picture 103 in the output order. As a result, a decoded picture 104 is obtained. The decoded picture 104 does not match the original picture 101.

Figure 33:
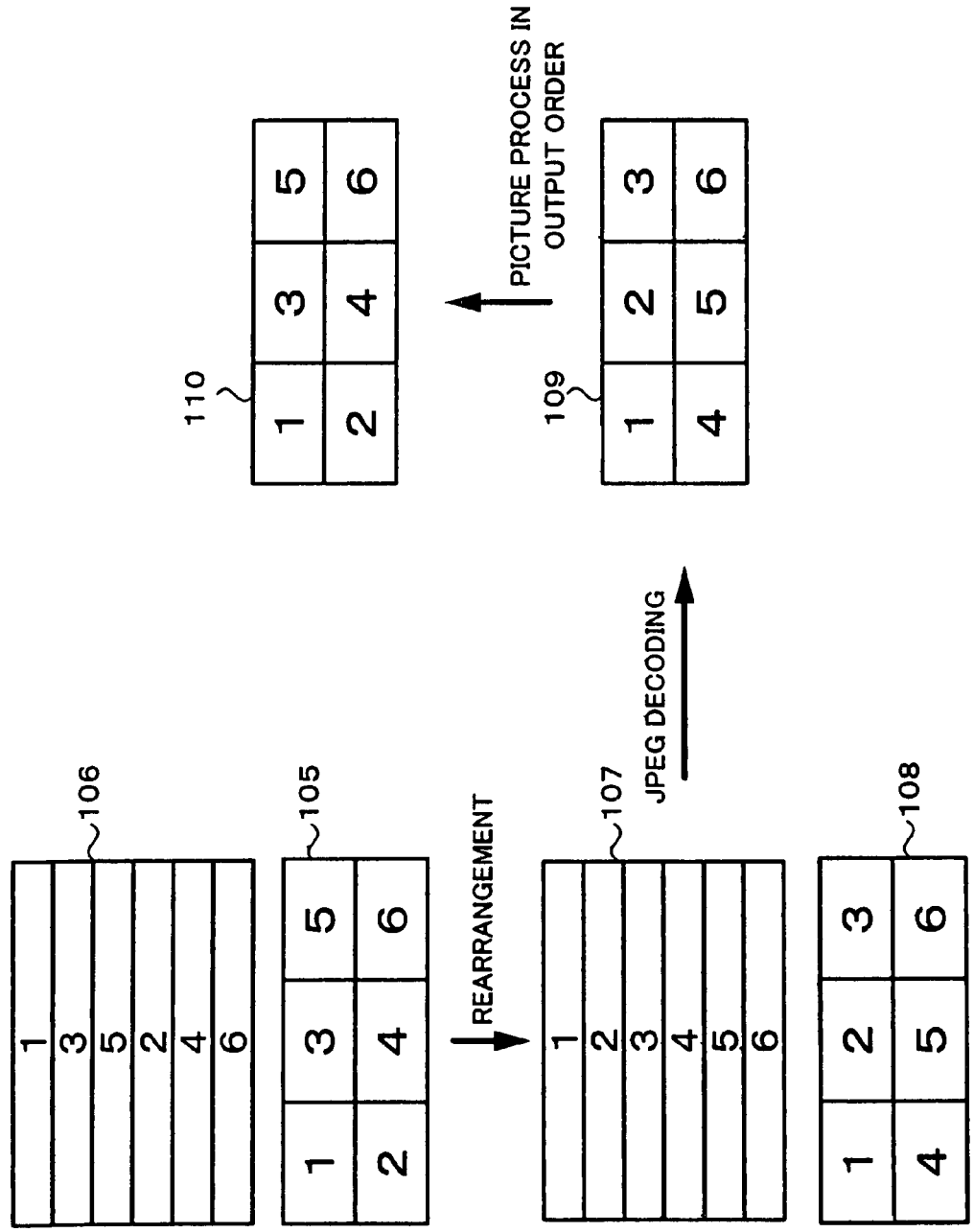
FIG. 33 is a schematic diagram describing a process on the decoding side according to the present invention.

FIG. 33 describes a process that the decoding side performs according to the present invention. The decoding side receives JPEG data 106 from the encoding side. A picture 105 corresponds to the JPEG data 106. The JPEG data 106 are rearranged. The decoding side performs the reverse process of the rearrangement process that the encoding side has performed. As a result, JPEG data 107 are obtained. In other words, the decoding side rearranges the encoded data from the regular process direction defined in the encoding method to the process direction of the picture process block. A picture 108 corresponds to the JPEG data 107.

The JPEG data 107 are output to the decoding section. As a result, a decoded picture 109 is obtained. Blocks of the decoded picture 109 are output in the order of (1→2→3→4→5→6). The blocks are processed in the output order. As a result, a processed picture 110 is obtained. The processed picture 110 matches the original picture (having the same arrangement as the picture 105).

Encoded data having delimiter codes are rearranged and then decoded. When data do not have delimiter codes, before they are rearranged and decoded, it is necessary to perform the delimiter code insertion process. In addition, when data are decoded, a vertical and horizontal mirror-inversion process, a rotation process, and so forth can be performed.

Although embodiments of the present invention were specifically described, the present invention is not limited to these embodiments. Instead, various modifications may be made based on spirit and scope of the present invention. For example, the present invention can be applied to a picture recording device, a personal computer, a PDA (Personal Digital Assistants), a picture transmitting device, a portable terminal, a mobile phone, and so forth that have a JPEG or MPEG encoding device as well as a digital still camera.

DESCRIPTION OF REFERENCE NUMERALS

2 Image Sensor
4 Camera Signal Processing Section
6, 24 Size Changing Processing Section
7, 26 Encoding Section
8, 34 Rearrangement Section
11 CPU
32A, 32B Memory Having Two-Bank Structure
S1 Read Picture from Memory in the Unit of a Block.
S2 Perform Picture Process.
S3 Input Data to Encoding Section.
S4 Encode Data in their Input Order.
S5 Write Encoded Data to Memory.
S6 Has Block been Completely Processed ?
S7 Has Process been Completed ?
S8 Insert Delimiter Code.
S9 Read JPEG Data.
S10 Rearrange JPEG Data.
S11 Write JPEG Data to Memory.
S21 Calculate New Start Position of MCU3 Based on Start Position or End Position of MCU2 or Stuffing Bits.
S22 Decode DC Component of MCU3.
S23 Encode Difference between DC component of MCU2 that has been Recorded and DC Component of MCU3.
S24 Place MCU3 after New Start Position.
S31 Calculate New Start Position of MCU 3 Based on Start Position of MCUX.
S32 Decode DC Components of MCUX AND MCU3.
S33 Encode Difference Between DC Component of MCUX and DC Component of MCU3.
S34 Place MCU3 and so Forth from New Start Position.
S41 Calculate New Start Position of MCU4 Based on Start Position or End Position of MCU3 or Stuffing Bits.
S42 Place MCU4 and so Forth from New Start Position.

The invention claimed is:

1. A picture processing apparatus, comprising:
a picture processing section;
an encoding section which encodes picture data processed by the picture processing section in a predetermined encoding unit, wherein the encoding section encodes the picture data in a block output order of the picture processing section; and
a rearrangement section which rearranges the block order from a process direction of the picture processing section to a regular process direction defined by an encoding method of the encoding section, the regular process direction being the encoding order of which the original picture is obtained when an encoded picture is decoded according to JPEG.

2. The picture processing apparatus as set forth in claim 1, wherein the rearrangement section rearranges the data which are output from the picture processing section in a unit of encoded data of which a data unit which matches the regular process direction has been encoded.

3. The picture processing apparatus as set forth in claim 1, wherein there are a plurality of types of lengths of data units which match the regular process direction, and a total of the plurality of the types of the lengths matches a width of the picture.

4. The picture processing apparatus as set forth in claim 1, wherein each of a height and a width of a unit of the data which are output from the picture processing section is an integer multiple of the encoding unit of the encoding section.

5. The picture processing apparatus as set forth in claim 1, wherein the encoding section is an encoder which compresses and encodes data with a variable length code and inserts a delimiter code having a predetermined value into each unit of encoded data of which a data unit which matches the regular process direction has been encoded.

6. The picture processing apparatus as set forth in claim 5, wherein the encoding section outputs a code which matches the regular process direction and which is independent from the unit after the delimiter code.

7. The picture processing apparatus as set forth in claim 5, wherein the rearrangement section rewrites the value of the delimiter code.

8. The picture processing apparatus as set forth in claim 5, wherein the encoding section is a JPEG encoder, and the rearrangement section deletes the delimiter code and changes a DC coefficient code of a macro block preceded by the delimiter code.

9. The picture processing apparatus as set forth in claim 1, wherein by treating a process unit of the picture processing section as one picture and encoding the picture data, a plurality of pieces of encoded data are generated, the encoded data whose units match the regular process direction are read, and the encoded data that have been read are rearranged.

10. The picture processing apparatus as set forth in claim 9, wherein start positions of the plurality of pieces of encoded data are memory addresses at equal intervals.

11. A picture processing method, comprising:
   causing an encoding section to encode picture data processed by a picture processing section in a predetermined encoding unit, including:
      encoding the picture data in a block output order of the picture processing section; and
      rearranging the block order from a process direction of the picture processing section to a regular process direction defined by the encoding section, the regular process direction being the encoding order of which the original picture is obtained when an encoded picture is decoded according to JPEG.

12. A processor encoded with a computer program for executing a picture processing method, comprising:
   causing an encoding section to encode picture data processed by a picture processing section in a predetermined encoding unit, including:
      encoding the picture data in a block output order of the picture processing section, and
      rearranging the block order from a process direction of the picture processing section to a regular process direction defined by the encoding section, the regular process direction being the encoding order of which the original picture is obtained when an encoded picture is decoded according to JPEG.

13. An imaging apparatus, comprising:
   a picture processing section which performs a picture process for picture data captured by an image sensor;
   an encoding section which encodes the picture data processed by the picture processing section according to a predetermined encoding unit, wherein the encoding section encodes the picture data in a block output order of the picture processing section; and
   a rearrangement section which rearranges the block order from a process direction of the picture processing section to a regular process direction defined by an encoding method of the encoding section, the regular process direction being the encoding order of which the original picture is obtained when an encoded picture is decoded according to JPEG.

14. A picture processing apparatus, comprising:
   a picture processing section which processes inputted picture data in a plurality of picture processing units;
   an encoding section which encodes picture data processed by the picture processing section in a predetermined encoding unit, wherein the encoding section encodes the picture data in a block output order of the picture processing section; and
   a rearrangement section which rearranges the block order from a process direction of the picture processing section to a regular process direction defined by an encoding method of the encoding section, the regular process direction being the encoding order of which the original picture is obtained when an encoded picture is decoded.

15. The picture processing apparatus as set forth in claim 14, wherein the rearrangement section rearranges the data which are output from the picture processing section in a unit of encoded data of which a data unit which matches the regular process direction has been encoded.

16. The picture processing apparatus as set forth in claim 14, wherein there are a plurality of types of lengths of data units which match the regular process direction, and a total of the plurality of the types of the lengths matches a width of the picture.

17. The picture processing apparatus as set forth in claim 14, wherein each of a height and a width of a unit of the data which are output from the picture processing section is an integer multiple of the encoding unit of the encoding section.

18. The picture processing apparatus as set forth in claim 14, wherein the encoding section is an encoder which compresses and encodes data with a variable length code and inserts a delimiter code having a predetermined value into each unit of encoded data of which a data unit which matches the regular process direction has been encoded.

19. The picture processing apparatus as set forth in claim 18, wherein the encoding section outputs a code which matches the regular process direction and which is independent from the unit after the delimiter code.

20. The picture processing apparatus as set forth in claim 18, wherein the rearrangement section rewrites the value of the delimiter code.

21. The picture processing apparatus as set forth in claim 18, wherein the encoding section is a JPEG encoder, and the rearrangement section deletes the delimiter code and changes a DC coefficient code of a macro block preceded by the delimiter code.

22. The picture processing apparatus as set forth in claim 14, wherein by treating a process unit of the picture processing section as one picture and encoding the picture data, a plurality of pieces of encoded data are generated, the encoded data whose units match the regular process direction are read, and the encoded data that have been read are rearranged.

23. The picture processing apparatus as set forth in claim 22, wherein start positions of the plurality of pieces of encoded data are memory addresses at equal intervals.

24. A picture processing method, comprising:
   a picture processing step which processes inputted picture data in a plurality of picture processing units;
   an encoding step which encodes picture data processed by the picture processing step in a predetermined encoding unit, wherein the encoding step encodes the picture data in a block output order of the picture processing step; and
   a rearrangement step which rearranges the block order from a process direction of the picture processing step to a regular process direction defined by an encoding method of the encoding step, the regular process direction being the encoding order of which the original picture is obtained when an encoded picture is decoded.

* * * * *